(12) United States Patent
Grundmann et al.

(10) Patent No.: US 10,381,878 B1
(45) Date of Patent: Aug. 13, 2019

(54) ADAPTER FOR ELECTRONIC DEVICES

(71) Applicant: X Development LLC, Mountain View, CA (US)

(72) Inventors: Michael Grundmann, San Jose, CA (US); Brian Adolf, Mountain View, CA (US); Eric Liu, Redwood City, CA (US); Mathias Fleck, Mountain View, CA (US); Samuel Dean Banks, Jr., Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 372 days.

(21) Appl. No.: 15/394,133

(22) Filed: Dec. 29, 2016

(51) Int. Cl.
　　*H02J 50/12* (2016.01)
　　*H02J 7/02* (2016.01)
　　*H02J 7/00* (2006.01)
　　*H01R 13/66* (2006.01)

(52) U.S. Cl.
　　CPC .............. *H02J 50/12* (2016.02); *H02J 7/025* (2013.01); *H01R 13/665* (2013.01); *H02J 7/0004* (2013.01)

(58) Field of Classification Search
　　CPC . H02J 5/005; H02J 7/025; H02J 17/00; B60L 11/182
　　See application file for complete search history.

(56) References Cited

U.S. PATENT DOCUMENTS

| | | | |
|---|---|---|---|
| 7,872,445 B2 | 1/2011 | Hui | |
| 8,169,185 B2 | 5/2012 | Partovi et al. | |
| 8,497,601 B2 | 7/2013 | Hall et al. | |
| 9,086,864 B2 | 7/2015 | Culbert et al. | |
| 2009/0072782 A1* | 3/2009 | Randall | G06F 1/1616 320/107 |
| 2012/0217925 A1* | 8/2012 | Chen | H02J 7/0045 320/108 |
| 2013/0043833 A1* | 2/2013 | Katz | H01M 10/46 320/108 |
| 2013/0093389 A1* | 4/2013 | Partovi | H01F 7/0252 320/108 |

(Continued)

OTHER PUBLICATIONS

Adapter, Wikipedia, https://en.wikipedia.org/wiki/Adapter, last accessed Jan. 13, 2017, 1 page.

(Continued)

*Primary Examiner* — Rexford N Barnie
*Assistant Examiner* — David A Shiao
(74) *Attorney, Agent, or Firm* — Fish & Richardson P.C.

(57) ABSTRACT

Disclosed herein is a method of determining an operational configuration of a wireless power adapter. The method includes determining whether the wireless power adapter is calibrated to supply a legacy device with electrical energy. The method further includes, in response to determining that the wireless power adapter is not calibrated to supply the legacy device with electrical energy, delivering a first power signal to the legacy device via a first electrical coupling member. The method also includes detecting a response of the legacy device to receiving the first power signal, and based on the response of the legacy device, determining an operational configuration of the wireless power adapter. Furthermore, the method includes configuring the wireless power adapter to operate according to the determined operational configuration.

19 Claims, 24 Drawing Sheets

(56) References Cited

U.S. PATENT DOCUMENTS

| | | | |
|---|---|---|---|
| 2013/0260676 A1* | 10/2013 | Singh | H04B 5/0037 |
| | | | 455/41.1 |
| 2013/0314069 A1* | 11/2013 | Suzuki | H02M 5/02 |
| | | | 323/318 |
| 2014/0203661 A1* | 7/2014 | Dayan | H01F 38/14 |
| | | | 307/104 |
| 2014/0292097 A1* | 10/2014 | Mach | H01F 38/14 |
| | | | 307/104 |
| 2015/0205750 A1 | 7/2015 | Hendin et al. | |
| 2015/0244175 A1 | 8/2015 | Abe | |
| 2015/0288195 A1* | 10/2015 | Ashery | H02J 5/005 |
| | | | 307/104 |
| 2016/0268843 A1 | 9/2016 | Baarman | |
| 2016/0330824 A1 | 11/2016 | Recker et al. | |

OTHER PUBLICATIONS

Travel Adapter, Amazon, https://www.amazon.com/Adapter-Worldwide-Universal-Adaptor-Charging/dp/B01DJ140LQ/ref=sr_1_14?ie=UTF8&qid=1484249406&sr=8-14&keywords=travel+adapter, last accessed Jan. 13, 2017, 1 page.

* cited by examiner

| Operational States | Common Mode (Capacitive) | Differential Mode (Capacitive) | Inductive Mode |
|---|---|---|---|
| Operational State 1 | ON | OFF | OFF |
| Operational State 2 | OFF | ON | OFF |
| Operational State 3 | OFF | OFF | ON |
| Operational State 4 | ON | ON | OFF |
| Operational State 5 | OFF | ON | ON |
| Operational State 6 | ON | OFF | ON |
| Operational State 7 | ON | ON | ON |
| Operational State 8 | OFF | OFF | OFF |

FIG. 8

ADAPTER FOR ELECTRONIC DEVICES

BACKGROUND

Unless otherwise indicated herein, the materials described in this section are not prior art to the claims in this application and are not admitted to be prior art by inclusion in this section.

Electronic devices, such as mobile phones, laptops, and tablets, have become an integral part of daily life. Other machines, such as cars, which have conventionally used non-electric power sources, are increasingly relying on electricity as a power source. As electronic devices are often mobile, it may not be feasible for devices to stay connected to a power source via wires. Thus, electronic devices may use batteries to supply electric power when a device is not coupled to a fixed power source.

Current battery technology, however, often does not meet the charge capacity and/or discharge rate demands of electronic devices, which may limit the range of moveable devices. Even in cases where batteries meet the power demands of a given device, such a device usually must be coupled to a fixed charging source via wires in order to recharge its battery. Such wired charging mechanisms may limit the movement, and thus the usability, of the device while it is being charged. Also, as the number of devices connected to a charging source increases, the number of wires in the proximity of an electrical outlet may increase, causing "cord clutter."

SUMMARY

In one aspect, a wireless power adapter is provided. The adapter includes a first electric coupling member operable to couple to a power source, a second electric coupling member operable to couple to a legacy device, and a wireless power receiver operable to receive electrical energy from a wireless power transmitter via a wireless resonant coupling link. The adapter also includes a controller that is configured to determine whether the wireless power adapter is calibrated to supply the legacy device with electrical energy. In response to the determination that the wireless power adapter is not calibrated, the controller is configured to deliver first power to the legacy device, where the first power is received from the power source via the first electric coupling member. The controller is further configured to receive information indicative of a response of the legacy device to receiving the first power. Based on the received information, the controller is configured to determine an operational configuration of the wireless power adapter. Yet further, the controller is configured to configure the wireless power adapter to operate according to the determined operational configuration.

In another aspect, a method is provided. The method involves determining whether the wireless power adapter is calibrated to supply a legacy device with electrical energy received via a wireless power receiver, where the wireless power receiver is operable to receive electrical energy from a wireless power transmitter via a wireless resonant coupling link. The method also involves in response to determining that the wireless power adapter is not calibrated to supply the legacy device with electrical energy, delivering first power to the legacy device via a first electrical coupling member, where the first power is received from a power source via a second electric coupling member. Further, the method involves detecting a response of the legacy device to receiving the first power. Yet further, the method involves based on the response of the legacy device, determining an operational configuration of the wireless power adapter. Yet further, the method involves configuring the wireless power adapter to operate according to the determined operational configuration.

In yet another aspect, a system is provided. The system includes means for determining whether the wireless power adapter is calibrated to supply a legacy device with electrical energy received via a wireless power receiver, where the wireless power receiver is operable to receive electrical energy from a wireless power transmitter via a wireless resonant coupling link. Further, the system includes means for in response to determining that the wireless power adapter is not calibrated to supply the legacy device with electrical energy, delivering first power to the legacy device via a first electrical coupling member, where the first power is received from a power source via a second electric coupling member. Yet further, the system includes means for detecting a response of the legacy device to receiving the first power. Additionally, the system includes means for based on the response of the legacy device, determining an operational configuration of the wireless power adapter. The system also includes means for configuring the wireless power adapter to operate according to the determined operational configuration.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 8 is a table illustrating modes of operation of a system, according to an example embodiment.

DETAILED DESCRIPTION

Figure 1:
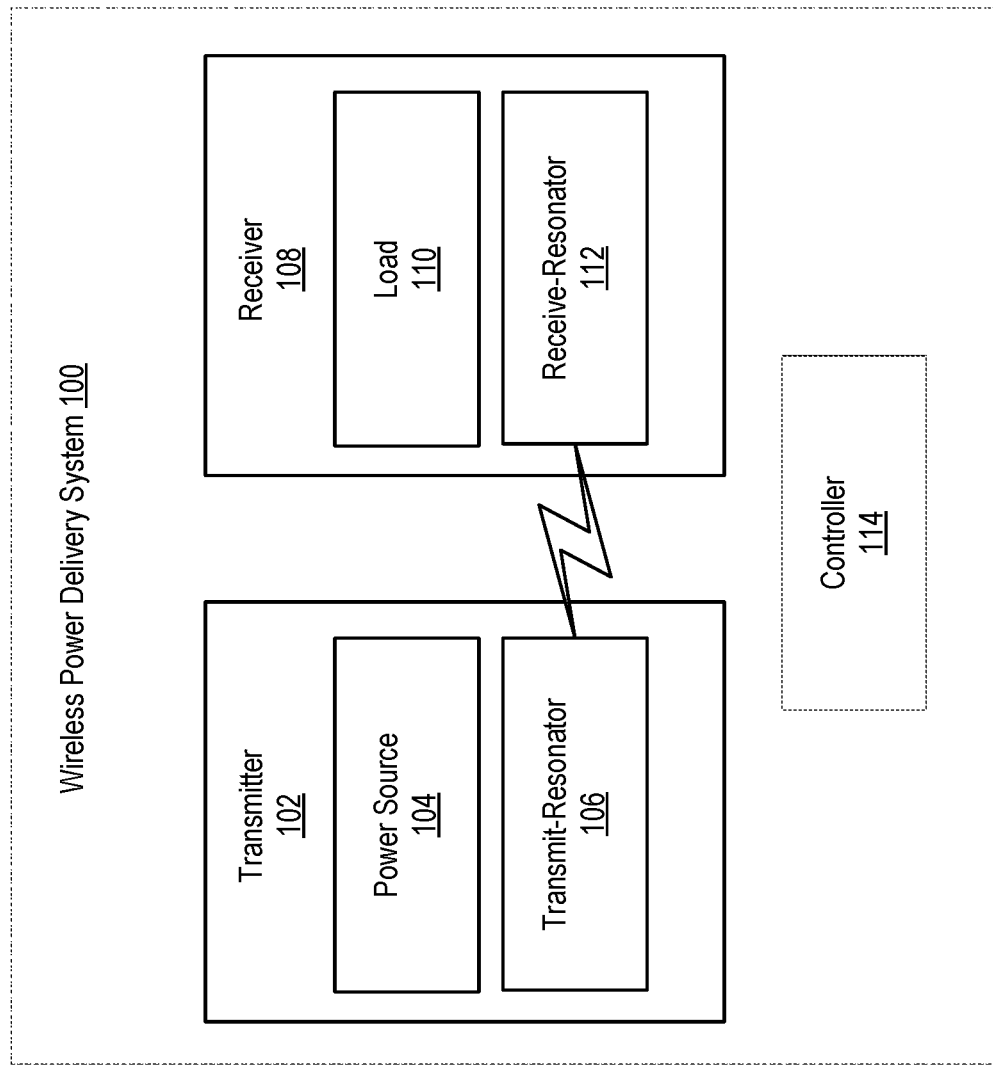
FIG. 1 is a functional block diagram illustrating the components of a wireless power delivery system, according to an example embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Furthermore, the term "capacitor" as used herein should be understood broadly as any system, including one or more elements, with a capacitive property. As such, the term "capacitor" may be used to refer to a lumped capacitive element and/or to a distributed capacitive element. Similarly, the term "inductor" as used herein should be understood broadly as any system, including one or more elements, with an inductive property. As such, the term "inductor" may be used to refer to a lumped inductive element and/or to a distributed inductive element.

I. Overview

Wireless power systems that wirelessly transfer electrical energy are currently being researched and developed in various industries. A wireless power system can include a transmitter and one or more receivers that receive electrical energy from the transmitter. Some wireless power receivers are developed for use with specific electronic devices. For example, a wireless power receiver can be integrated as part of a mobile device to enable the mobile device to wirelessly receive electrical energy. However, these wireless power receivers are typically manufactured as part of the specific device, and therefore, are configured for use only with the specific device.

The majority of electronic devices that are currently in use, however, receive power via a legacy power cord that is directly coupled to a power source. Electronic devices that receive power from a power source via a direct electrical connection are also referred to herein as "legacy devices." Legacy devices generally do not included wireless power receivers, and therefore rely on a physical connection with the power source in order to receive power. Therefore, a consumer who wishes to utilize a wireless power system may incur significant costs to replace their existing electronic devices with devices that have wireless power transfer capability. Furthermore, the types of electronic devices currently on the market that include wireless power receivers are limited, and therefore, the types of devices that can receive power wirelessly are limited.

Disclosed herein is a wireless power adapter that can be coupled to legacy electronic devices in order to wirelessly supply the devices with electrical energy. The electrical energy may be used to directly power the device or to charge a battery of the device. The wireless adapter may include a wireless power receiver and an outlet into which a user may plug the electrical plug of the legacy device. The wireless power receiver can receive power from a wireless power transmitter via a wireless resonant coupling link, and the adapter can supply the legacy device, which is plugged into the adapter, with the received electrical power.

However, different types of legacy devices have different power requirements. Therefore, although the wireless adapter can be coupled to any legacy device that includes a legacy cord, the adapter may need to be calibrated in order to provide an electronic device with the power it needs to function properly. One solution may be to manufacture different types of wireless adapters, where each type is configured to provide power to a specific type of legacy device. A consumer may then purchase the wireless power adapter that works with the specific type of legacy device that the consumer wishes to power wirelessly.

This solution, although viable, may not be attractive from a consumer's perspective because the consumer would need to purchase a different adapter for each type of legacy device that they own. Furthermore, assuming the consumer purchases an adapter for each of their portable devices (e.g., laptop, mobile phone, tablet, etc.), the consumer would need to carry each of the adapters in addition to the legacy cords in order to charge devices on the go.

Accordingly, it may be more useful, at least from a consumer's standpoint, for a wireless adapter to be "universally" compatible with more than one type of legacy device. However, in order for the wireless adapter to be compatible with legacy devices that have different power requirements, the wireless adapter may need to be calibrated to provide each type of legacy device with its respective power requirements.

Disclosed herein is a wireless adapter that can be calibrated to supply power to different types of legacy devices. Also disclosed herein is a method of calibrating the wireless adapter to supply power to the particular type of legacy device to which the wireless adapter is coupled. The calibration method may be performed by the adapter after the adapter is coupled to the legacy device. After the adapter is coupled to a legacy device, the adapter may determine whether the adapter is calibrated to supply the device with electrical energy. If the adapter is not calibrated, the adapter may then perform the calibration process.

In an embodiment, the calibration process may involve the adapter providing the legacy device with a test power signal. The wireless adapter may then measure the device's response to receiving the test power signal. Based on the measured response, the wireless adapter may characterize the device to determine a type of the device. Further, the adapter may determine based on the type of the device and the response of the device the power requirements of the device. Once the power requirements are determined, the adapter may determine an operational configuration of the adapter at which the adapter provides the legacy device with power according to the power requirements of the device.

For example, an operational configuration of the wireless power adapter may be an AC-AC configuration. In an AC-AC configuration, the adapter may receive an AC power signal from the wireless power transmitter, and may then supply the AC power signal to the legacy device plugged into the wireless adapter. Other types of operational configurations are also discussed herein.

II. Example Systems and Operation

An example system 100 for wireless transfer of power is shown in FIG. 1. The system 100 may include various subsystems, elements, and components as described below. One or more subsystems may include a controller configured to carry out one or more of a variety of operations. In accordance with example embodiments, a controller may include one or more processors, memory, and machine language instructions stored in the memory that when executed by the one or more processors cause the controller to carry one or more of its controlling functions or operations. A controller may also include one or more interfaces for device control, communications, etc.

In further accordance with example embodiments, various functions and operations described below may be defined as methods that may be carried within the system, where at least some aspects of the methods can be implemented based on functions and/or operations carried out by one or more controllers and/or one or more of processors. Other aspects of the methods may be carried out by other elements or components of the system, under control of one or another controller, in response to environmental factors, or in response to receiving or detecting a signal, for example.

In an example embodiment, a wireless power delivery system may include a power source configured to wirelessly deliver power to a load via a transmitter and a receiver. As shown in FIG. 1, system 100 may include a transmitter 102 and a receiver 108, both of which may be considered subsystems of system 100, and a controller 114. For the sake of brevity in FIG. 1 and elsewhere herein, control functions and operations are generally described as being carried out only by the controller 114. Thus, controller 114 may be viewed conceptually as a unified control function. It should be understood, however, that as subsystems of system 100, the transmitter 102 and receiver 108 may each include its own controller, as described elsewhere herein. Alternatively or additionally, the controller 114 may include a distributed computing system, e.g., a mesh network.

As such, the various control functions and operations attributed to controller 114 may be implemented across one or more controllers, such as ones included (but not shown) in transmitter 102 and receiver 108. For example, an operation described as being carried out by the transmitter could be done so under control of a controller in the transmitter. Similarly, an operation described as being carried out by the receiver could be done so under control of a controller in the receiver.

In addition to each of the transmitter 102 and receiver 108 possibly including its own controller, each of them may also include and/be constructed of various types of electrical components. For example, electrical components may include circuit elements such as inverters, varactors, amplifiers, rectifiers, transistors, switches, relays, capacitors, inductors, diodes, transmission lines, resonant cavities, and conductors. Furthermore, the electrical components may be arranged in any viable electrical configuration, such as lumped or distributed.

Returning to FIG. 100, the transmitter 102 of system 100 may include a transmit-resonator 106. The transmit-resonator 106 may have a high Q value and may be configured to resonate at one or more resonant frequencies. Transmitter 102 may be coupled with power source 104, which may be configured to supply transmit-resonator 106 with a signal oscillating at one of the transmit-resonator resonant frequencies. In an example, the power source 104 may include a power oscillator to generate the oscillating signal, which may be oscillating at one of the transmit-resonator resonant frequencies. The power oscillator may be powered by a power signal received from an electrical outlet. For example, the electrical outlet may supply the power source 104 with an AC voltage of 120 V at a frequency of 60 Hz. In other examples, the power source may include a converter that may use a power from a power signal, which may have a low-frequency (i.e. 60/50 Hz), to generate a carrier signal that has an oscillation frequency of one of the transmit-resonant frequencies. The carrier signal may be modulated to carry the power signal and may thus be the oscillating signal supplied by the power source 104.

Furthermore, the resonant frequency (00 at which the signal may oscillate, also called the system resonant frequency, may be chosen by controller 114 of system 100. Transmit-resonator 106 may resonate, upon receiving the oscillating signal from source 104, and consequently, may generate a field oscillating at the system resonant frequency.

Receiver 108 may include a receive-resonator 112. The receive-resonator 112 may have a high Q value and may also be configured to resonate at the system resonant frequency. The receiver 108 may also include a load 110. Thus, if receive-resonator 112 is in the range of the oscillating field (i.e., the field penetrates receive-resonator 112), resonator 112 may wirelessly couple with the oscillating field, thereby resonantly coupling with transmit-resonator 106. Receive-resonator 112, while resonating, may generate a signal that may be delivered to the load 110. Note that in the implementation where the oscillating signal generated by the power source 104 is a modulated carrier signal (generated by a converter), the receiver 108 may include a filter network. The filter network may be used to isolate the power signal from the modulated carrier signal. The power signal (i.e., 50/60 Hz signal) may then be delivered to the load 110.

In example systems, there may be more than one receiver. This is described below in further detail.

Figure 2:
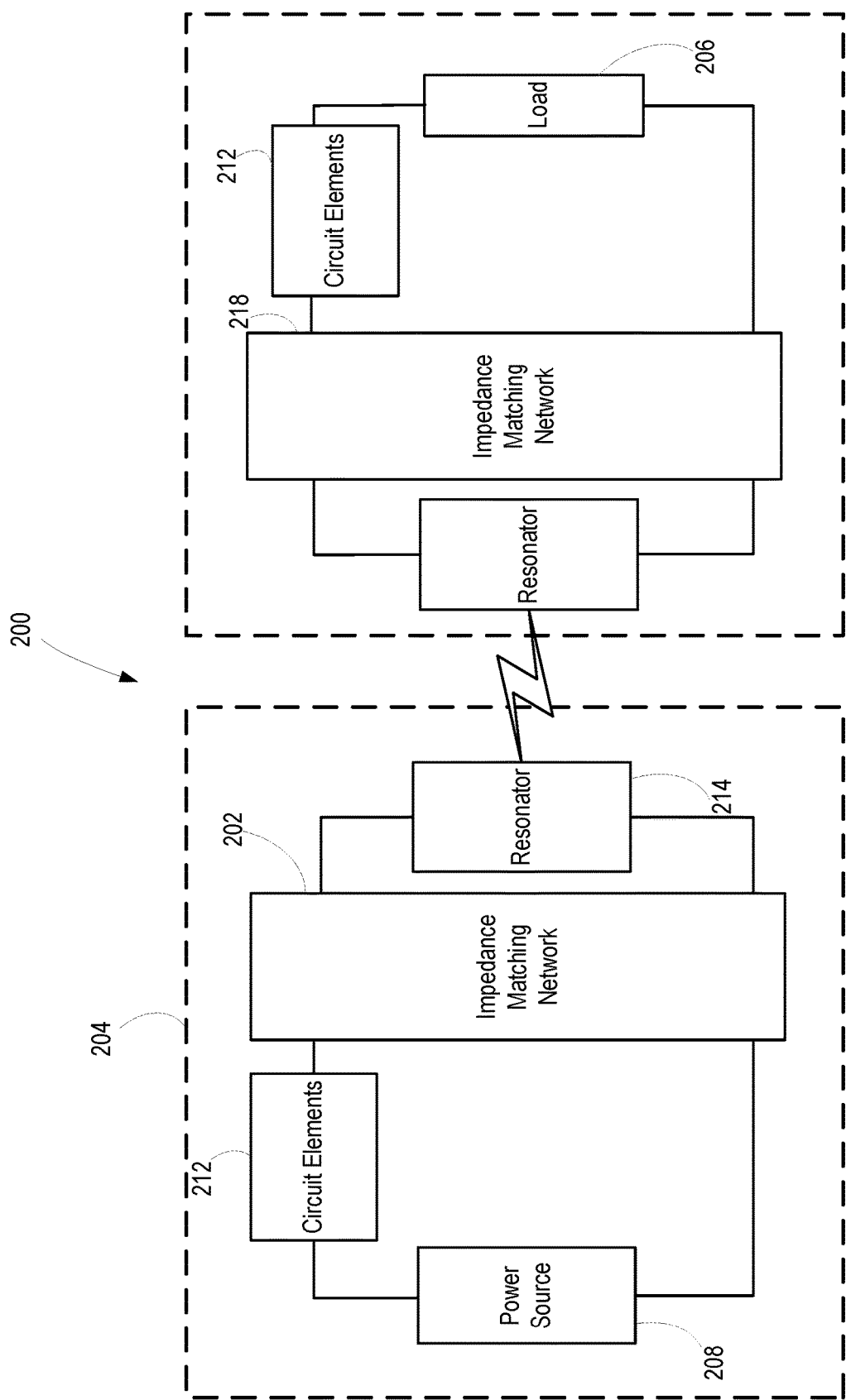
FIG. 2 is a functional block diagram illustrating an impedance matching circuit coupled to a transmitter, according to an example embodiment.

Wireless power delivery systems may include at least one impedance matching network configured to increase the efficiency of wireless power transfer. FIG. 2 illustrates an impedance matching network in a system, according to an exemplary embodiment. As illustrated in FIG. 2, the impedance matching network 202 is coupled to the transmitter 204. Further, the impedance matching network 202 may be in series, parallel, or in any other configuration with the transmit-resonator 214. In some embodiments, an impedance matching network 218 may additionally and/or alternatively be coupled to the receiver. Furthermore, the impedance matching networks 202 and 218 may each include any combination of L matching networks, pi networks, T networks, and/or multi-section matching networks.

In some embodiments, the system may deliver a determined power to the load by configuring the impedance matching network to operate at a determined impedance. In particular, a controller of the system may determine a power to deliver from the transmitter to the load. The controller may use at least the reflected impedance, from the load to the transmitter, to determine the impedance that the impedance matching network(s) may be configured to match. Accordingly, the system may deliver the determined power to the load when the impedance matching network matches the determined impedance.

More specifically, the controller of the system may generate a model, such as a SPICE model, of the system to determine the impedance that the impedance matching network may match. The model may include known values such as the actual impedance of the load, which the controller may receive from the receiver using methods described herein. However, the controller may need to determine the actual power supplied to the load from the transmitter and the reflected impedance (from the load to the transmitter) in order to fully characterize the model of the system (e.g., to derive the coupling factor k). The controller may use the fully characterized model of the system to dynamically impedance match by precisely determining the impedance that the impedance matching circuit may match.

In an embodiment, the system may include a bidirectional coupler, which may be used to determine the actual power supplied to the load from the transmitter and the reflected impedance from the load to the transmitter. The bidirectional coupler may be used in conjunction with a computer and/or a controller to precisely solve for an impedance of the load connected to it. The bidirectional coupler may also be used, in conjunction with a computer and/or a controller, to precisely solve for the amount power leaving the power source. The value of the reflected impedance of a load and the amount power leaving the source may be used to adjust the impedance matching network. Accordingly, the system may be configured to dynamically impedance match in a single step by using the bidirectional coupler to determine the actual power supplied by the source and the reflected impedance from the load to the transmitter.

However, the value of the reflected impedance from the load may change due to different factors, such as a change in the coupling between a transmitter and a receiver. The coupling between a transmitter and a receiver may change due to various factors, such as a change in the distance between the transmitter and the receiver. For example, the receiver may move during power transfer, which may change the coupling between the transmitter and the receiver. Such relative movement may change the reflected impedance of the load. Accordingly, as the reflected impedance from the load to the transmitter changes, the controller may be configured to continuously or intermittently solve for the actual power delivered to the load and the reflected load impedance, in order to dynamically impedance match.

Figure 3:
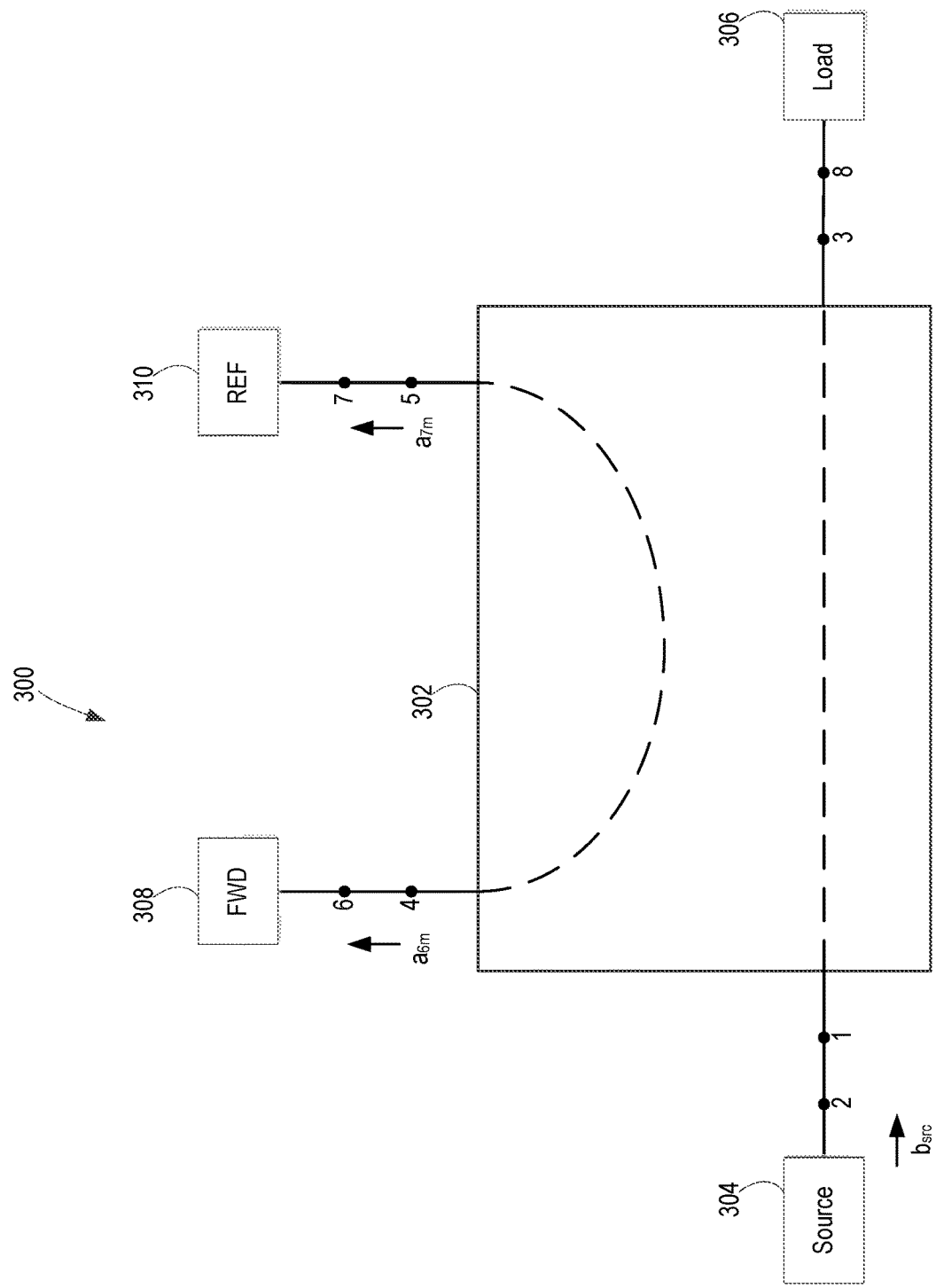
FIG. 3 is a diagram illustrating a representation of a bidirectional coupler used in a mathematical derivation, according to an example embodiment.

FIG. 3 illustrates a network representation of a system, including the bidirectional coupler 302 that is coupled in cascade between a power source 304 and a load 306, according to an exemplary embodiment. As illustrated in FIG. 3, the bidirectional coupler may be coupled between the power source at port 2 and the rest of the system (lumped into load 306) at port 8. Generally, there may be forward and reflected power waves at each port of the bidirectional coupler (ports 1, 3, 4, and 5). The forward and reflected waves, and thus the power and impedance, at each port, may be precisely determined by fully characterizing the RF properties of the bidirectional coupler. For instance, a mathematical relationship between the incoming and outgoing waves on each of the bidirectional coupler 302's ports may be used to precisely calculate the power delivered to the load 306 and the load 306's reflected impedance back to the source 304. The mathematical relationship may use an S-parameter characterization of the bidirectional coupler 302 to relate between the incoming and outgoing waves on each of the bidirectional coupler 302's ports.

The bidirectional coupler 302 may operate by coupling forward power from port 1 to port 3. An attenuated forward power may be coupled to port 4 and sampled at measurement FWD port 6. Additionally, a small amount of forward power may also be coupled into port 5 and measured at REF port 7. Likewise, reflected power is coupled from port 3 to port 1, and an attenuated power may be coupled to port 5 and sampled at measurement REF port 7. Additionally, a small amount of reflected power may be coupled into port 4 and measured at FWD port 6. Despite these non-idealities, of the forward power coupling to port 5 and the reflected power coupling to port 4, a computer and/or a controller may precisely calculate the power delivered to the load 306 and the load 306's reflected impedance.

The premeasured values of the mathematical relationship (A) may include a 4×4 S-parameter matrix and the input reflection coefficient, an S-parameter, of power source 302. Further, the non-idealities in the operation of the bidirectional coupler may be accounted for by premeasuring the 4×4 S-parameter matrix of the bidirectional coupler 302. In some embodiments, the S-parameters may be premeasured using a vector network analyzer (VNA). The measured S-parameters may be stored in a lookup table that a controller of system 300 may have access to.

Further, as explained above, the bidirectional coupler 302 may be used to periodically make real-time measurements of waves that may be used to solve for the power delivered to the load 306 and the load 306's reflected impedance. Specifically, in order to precisely calculate the power delivered to the load 306 and the load 306's reflected impedance, both the absolute magnitude of the power signals at ports 6 and 7 may be measured along with the phase of each signal with respect to the other. FWD and REF may include any measurement device or circuitry capable of measuring signals, e.g., an ammeter, a voltmeter, a spectrum analyzer, etc. Furthermore, FWD and REF may send information indicative of the respective measured signals to the controller of the system.

Furthermore, certain configurations of network 300 may simplify the S-parameter characterization of the bidirectional coupler 302. By design, FWD 308 and REF 310 may be impedance matched to the transmission line that carries the signals to each port to prevent signals from reflecting when measured at each port. For example, FWD port 308 and REF port 310 may be 50Ω terminated when a transmission line that has characteristic impedance (Z0) of 50Ω is used to carry the signal to each port.

Accordingly, a controller of a wireless power delivery system may use a bidirectional coupler to solve for the reflected impedance of the load and the power delivered to the load. The system may use the solved for values in the model of the system to fully characterize the system. As such, at least the coupling factor k may be calculated. Further, the controller may use the model of the system to predict the amount of power that may be delivered to a load by adjusting the impedance that the impedance matching circuit may match.

Further, the controller may periodically measure the reflected impedance of the load and the power delivered to the load, according to a predetermined time period, which may range from microseconds to tens of seconds in length. After each measurement, the controller may periodically adjust at least one impedance matching network of the system. In an example, a controller may measure the reflected impedance and may accordingly adjust an impedance matching network every millisecond using the method described above. Other time intervals are possible. Alternatively, the controller may measure the reflected impedance of the load and the power delivered to the load continuously. In such a scenario, the controller may continuously adjust an impedance matching network of the system to deliver a determined power to the load.

In some embodiments, the wireless power delivery system may include a plurality of receivers coupled to a single transmitter with a single bidirectional coupler. In such a scenario, each receiver may reflect a signal to the transmitter due to a possible impedance mismatch at each load coupled to each receiver. The controller may use the measured values to fully characterize the system in order to determine an impedance that the impedance matching network may match.

In some embodiments, a plurality of receivers may be coupled to a single bidirectional coupler. The bidirectional coupler may use time-division multiplexing (TDM) to send the reflected signal of each receiver to the measurement device during a given interval of time. The controller may then use the method described above to solve for the reflected impedance of each load coupled to each respective receiver.

The controller of the system may adjust at least one impedance matching circuit based on the measured values. In an example embodiment, a system with a plurality of receivers may include an impedance matching network coupled to the transmitter and/or to each of the receivers. However, as the transmitter may receive different reflected impedances from each load, it may not be possible for the controller to adjust the impedance matching network to simultaneously match the reflected impedance of each receiver and the impedance of the power source. Accordingly, in some embodiments, the controller may adjust at least one impedance matching network of the impedance matching networks coupled to each of the receivers. In other embodiments, the controller may adjust the impedance matching network, coupled to the transmitter, to match the reflected impedance of a selected receiver from the plurality of receivers. As such, the selected receiver, whose reflected impedance was matched at the impedance matching network, may proportionately receive more power than the other receivers in the system. In some embodiments, wireless power delivery to the selected receiver may be more efficient than such power delivery to other receivers of the plurality of receivers.

In other examples, a system with a plurality of receivers may perform impedance matching according to time-division (TDM) and/or frequency-division (FDM) multiplexing. For instance, in a TDM scheme, each receiver may be configured to couple to the transmitter with a single impedance matching network during a specific time interval. The system may receive a reflected signal from a receiver during the specific time interval that the receiver is coupled to the transmitter. In such a scenario, the controller may adjust the impedance matching network such that each receiver may receive maximum power during the interval that the receiver is coupled to the transmitter. In an example embodiment, each receiver of the plurality of receivers may be assigned a respective time slot according to a receiver priority or a receiver order. The time slots may be equal in duration, but need not be equal. For example, receivers with higher receiver priority may be assigned to longer time slots than those receivers with a lower receiver priority.

In a FDM scheme, each receiver may be configured to couple to the transmitter with on a specific respective frequency. The system may receive a respective reflected signal from each receiver on the specific frequency that the receiver is coupled to the transmitter on. In such a scenario, the controller may adjust the impedance matching network(s), which may be connected to the transmitter and/or to each of the receivers, such that each receiver may receive a determined amount of power.

In yet another example of a system with a plurality of receivers, a controller may determine the power that each receiver may receive simultaneously from the transmitter by adjusting the impedance matching network. Specifically, the impedance of the impedance matching network may determine, at least in part, the amount of power that each receiver may receive. For example, each receiver may receive power based on at least a difference between the receiver's impedance and that of the impedance matching network. Accordingly, the controller may adjust the impedance matching network so as to increase or decrease an amount of power delivered to a respective receiver, based at least on the receiver's impedance.

A controller may determine the amount of power that each receiver may receive from the transmitter based on various parameters. In an example embodiment, each receiver may be associated with a respective priority such that higher priority receivers may receive more power during a single power distribution cycle than lower priority receivers. In other examples, a current charging state of the receiver (if the receiver is coupled to a load that includes a battery), may determine the amount of power that a receiver may receive. That is, a receiver with a low battery level may receive higher priority than a receiver with a full battery. It is understood that the controller may distribute power to each receiver of the plurality of receivers based on a variety of other parameters.

Within examples, a controller may receive information indicative of at least one parameter from a receiver when authenticating the receiver. As such, the controller may generate a dynamic priority list based on the received information. In an example embodiment, the dynamic priority list may be updated when a receiver connects or disconnects from a transmitter. Further, a controller may store the received information and the corresponding dynamic priority lists either locally or on a server. In other examples, a receiver may send a controller updated information if a parameter of the receiver changes after the initial synchronization process. In other examples, a controller may periodically query a receiver, via a side-channel communication link, for example, to request information regarding the state of the receiver. As such, the controller may receive, via the side channel, for example, information such as the current charging state of a battery of a receiver or the current power requirements of a receiver.

In yet other examples, a system may include one or more impedance matching networks in each receiver of the plurality of receivers. A system may additionally or alternatively include impedance matching networks in the transmitter and at least one of the receivers. In such scenarios, a controller may be configured to adjust a plurality of impedance matching networks of the system such that each receiver may receive a determined amount of power from the transmitter.

Additionally or alternatively, the system may use the dynamic impedance matching method described above to detect a parasitic receiver. Specifically, a controller of the system may use information, such as nominal impedance, about authorized receivers to generate a circuit model of at least a portion of the wireless power delivery system. Additionally or alternatively, the controller may generate the circuit model based on an approximation, estimation, or other determination of a coupling condition between the transmitter and the receiver, which may be based on their relative locations. Based on the circuit model, the controller may calculate an ideal power reception amount that it may receive from each receiver. Accordingly, the controller may compare the calculated ideal power received and the actual power received. If the ideal and actual powers received are not equal within a specified margin of error, the controller may determine that a parasitic device may be present in the system. For example, the controller may determine that a parasitic device may be present in the system if the value of the calculated power received varies by more than 10% of the value of the actual power received. Additionally or alternatively, the controller may use other methods disclosed herein to identify parasitic receivers.

A. Coupling Modes

A transmitter and a receiver of a wireless power delivery system may establish a wireless coupling resonant link, and thus become resonantly coupled, via various coupling modes. Each coupling mode is associated with a type of resonator that may be included in a transmitter and/or a receiver. Accordingly, a system may excite a type of resonator so as to provide a wireless resonant link via the associated coupling mode. Furthermore, the system may maintain multiple wireless resonant links of different coupling mode types at any given time. Within examples, a transmitter and a receiver of a system may include at least one of three resonator types. As such, the operational state of a system may utilize at least one of three resonant coupling modes.

Figure 4A:
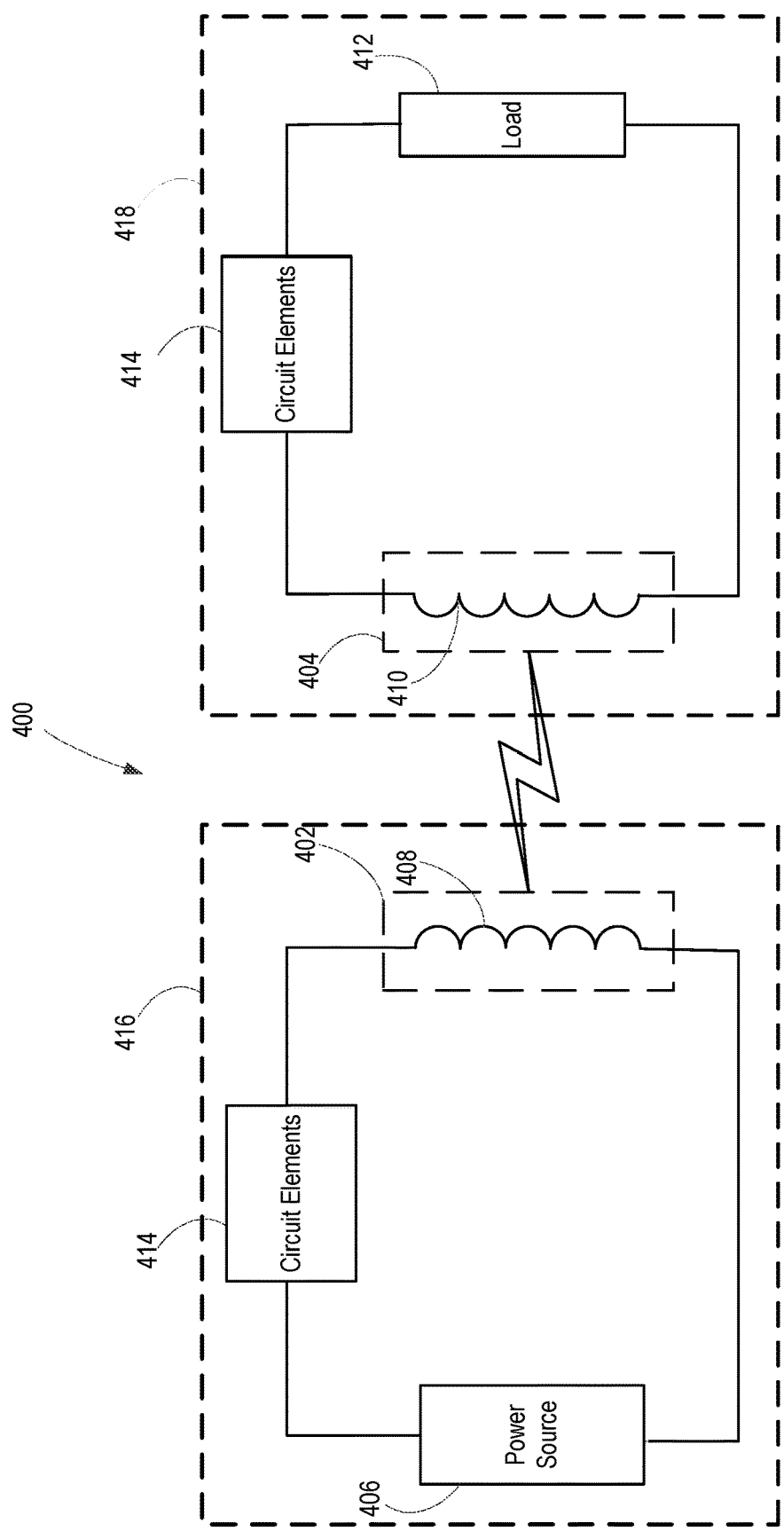
FIG. 4A to 4B illustrate a simplified circuit diagram of inductive resonant coupling, according to an example embodiment.
Figure 4B:
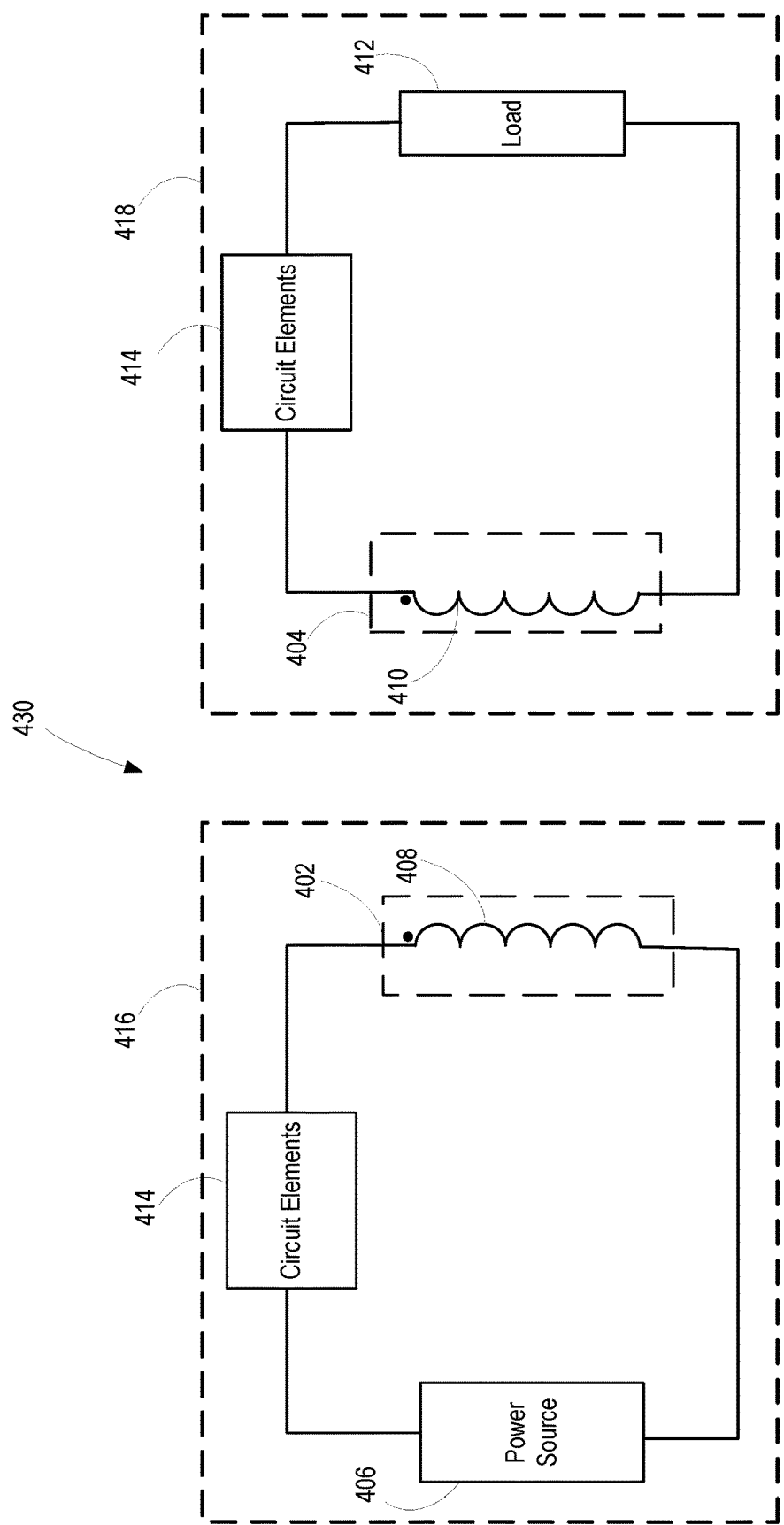

FIG. 4A and FIG. 4B illustrate an inductive resonant coupling mode, the first coupling mode, according to an exemplary embodiment. Each of transmit-resonator 402 and receive-resonator 404 may include at least an inductor. Further, each resonator may be configured to resonate at least at the system resonant frequency of system 400. Transmit-resonator 402 may resonate upon receiving a signal, from power source 406, that is oscillating at the system resonant frequency. Thus, transmit inductor 408 of transmit-resonator 402 may generate a magnetic field oscillating at the system resonant frequency. Receive-resonator 404 may couple with the oscillating magnetic field if it is within proximity to the transmit-resonator 402. As a result, a wireless coupling resonant link may be established. Coupled receive-resonator 404 may then resonate, and may therefore generate a signal that may be delivered to load 412.

Additionally or alternatively, the system may include a transmitter and/or a receiver that include a capacitive resonator, which may be operable to couple the transmitter and the receiver. In an example embodiment, each of the transmitter capacitive resonator and the receiver capacitive resonator may include at least a capacitor. The transmit-resonator may resonate upon receiving, from the power source, a signal oscillating at the system resonant frequency. As the transmit-resonator resonates, the capacitor of the transmit-resonator may generate an electric field oscillating at the system resonant frequency. The receive-resonator, if in proximity to the transmit-resonator, may couple with the oscillating electric field; thereby establishing a wireless coupling link between the transmitter and the receiver. As such, the receive-resonator may resonate, and may therefore generate a signal that may be delivered to a load coupled to the receiver.

In an example embodiment, a system may include at least one of two types of capacitive resonators, each of which may be associated with a respective coupling mode. The two capacitive resonators differ in the configuration of their respective capacitors. The first capacitive resonator may include a common mode capacitor, which may support a capacitance between a single conductor and ground. A common mode capacitive resonator may be operable to provide a wireless coupling link via a coupling mode termed common mode. The second capacitive resonator type may include a differential mode capacitor, which may support a capacitance between two conductors. A differential mode capacitive resonator may be operable to provide a wireless coupling link via a coupling mode termed differential mode.

Figure 5A:
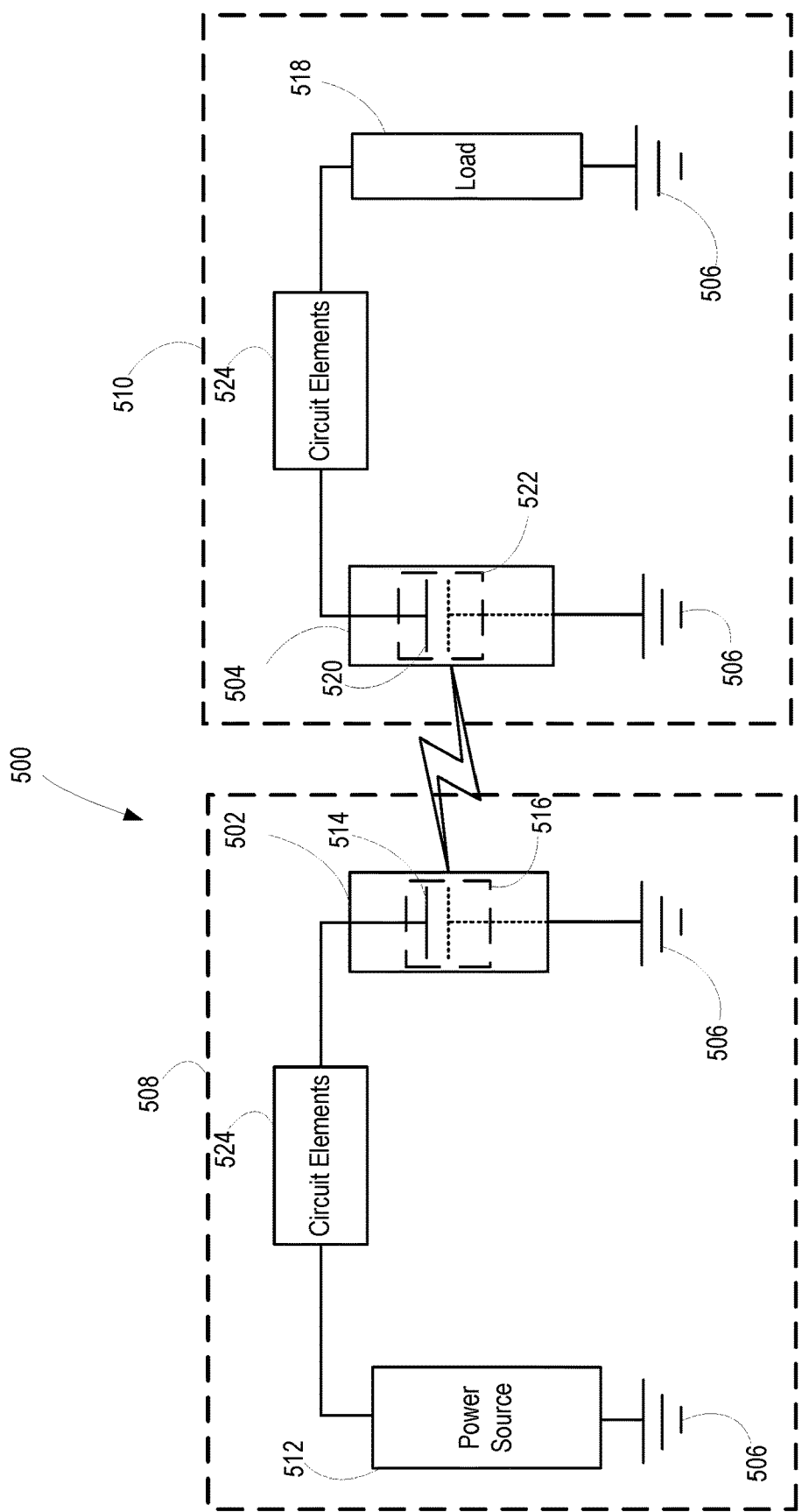
FIG. 5A to 5C illustrate a simplified circuit diagram of common mode capacitive resonant coupling, according to an example embodiment.
Figure 5B:
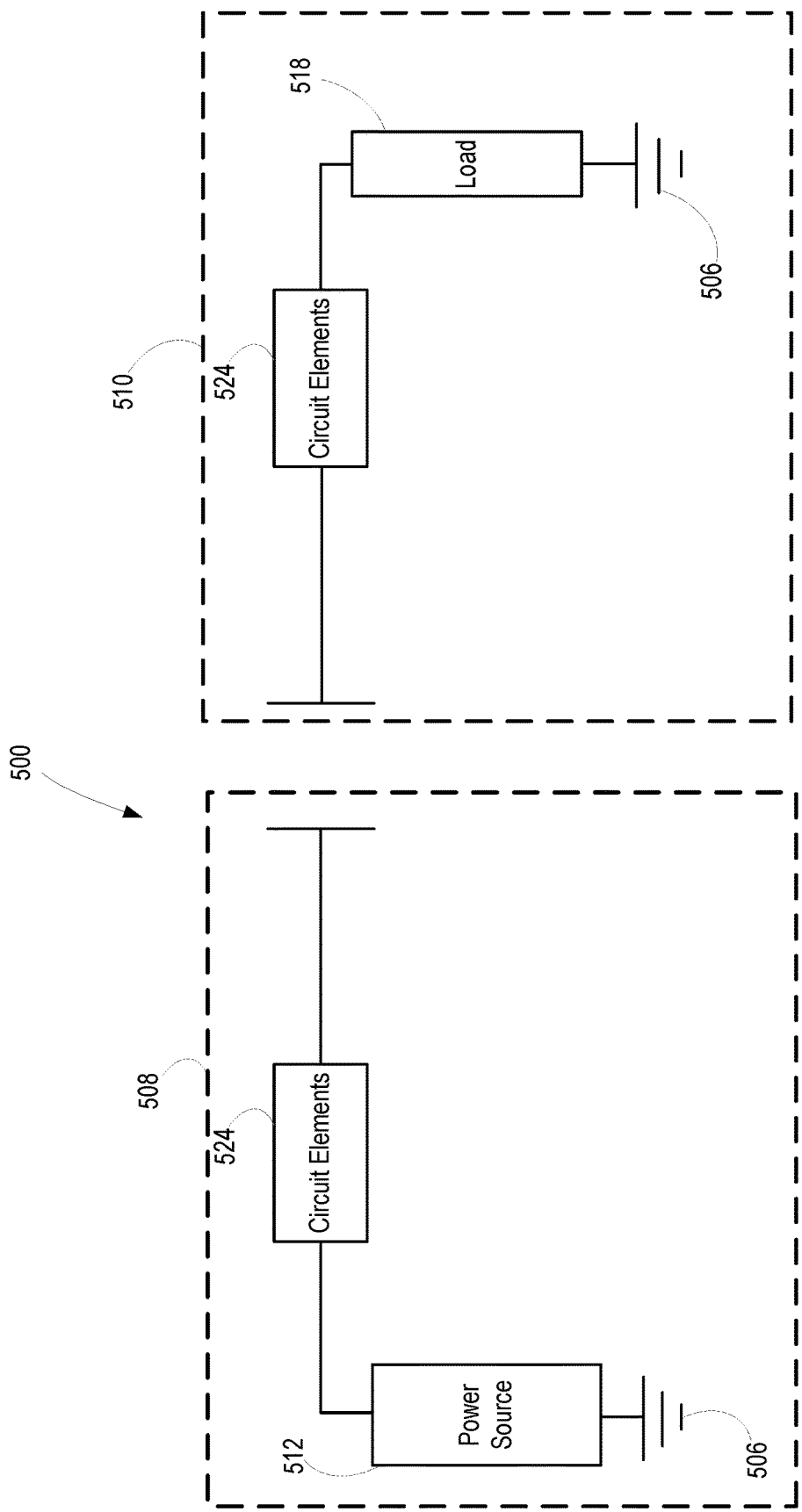
Figure 5C:
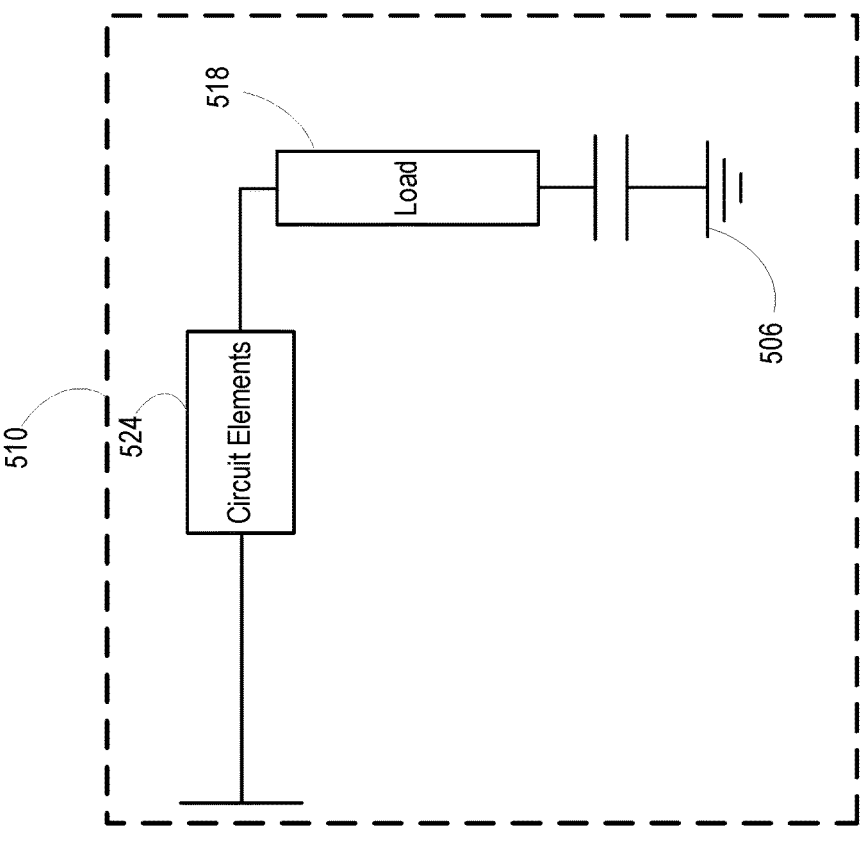
Figure 5C:
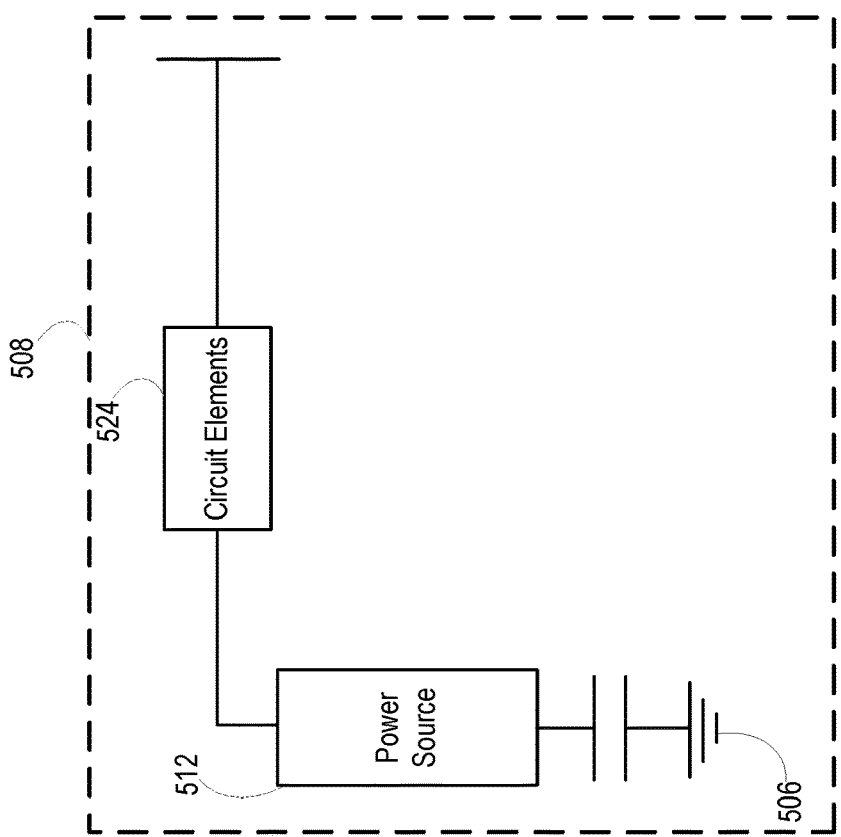

FIG. 5A, FIG. 5B, and FIG. 5C illustrate a system, in three representations, that includes a common mode capacitive resonator, according to an exemplary embodiment. Each of transmit-resonator 502 and receive-resonator 504 includes a common mode capacitive resonator. As such, each resonator includes a common mode capacitor that includes a conductor and ground reference 506. Ground reference 506 may conduct current to complete the circuit of transmitter 508 and receiver 510. Further, transmitter 508 may be coupled with power source 512 that may be connected on one end to ground reference 506 and on the other end to at least transmitter conductor 514. Optionally power source 512 need not be connected to the ground reference 506. Transmit-resonator 502 may resonate upon receiving, from power source 512, a signal that is oscillating at the system resonant frequency. As the transmit-resonator 502 resonates, common mode capacitor 516 of the transmit-resonator 502 may generate an electric field oscillating at the system resonant frequency. Receiver 510 may include load 518 that may be connected on one end to ground reference 506 and on the other end to receiver conductor 520. If within the near field of transmit-resonator 502, the receive-resonator 504 (which includes common mode capacitor 522) may couple with the oscillating electric field, thereby establishing a wireless resonant coupling link. As such, receive-resonator 504 may resonate, and may generate a signal that may be delivered to the load.

In some embodiments, the ground reference of the common mode capacitors may be connected to earth ground via a direct or an indirect connection. For example, the ground reference may include the infrastructure of a building housing the wireless power system, which may include an indirect connection to earth ground. In other examples, the ground reference may include a conductive object connected to common mode capacitors. As such, the conductive object may provide a conductive return path in a circuit including a transmitter and/or a receiver.

Figure 6A:
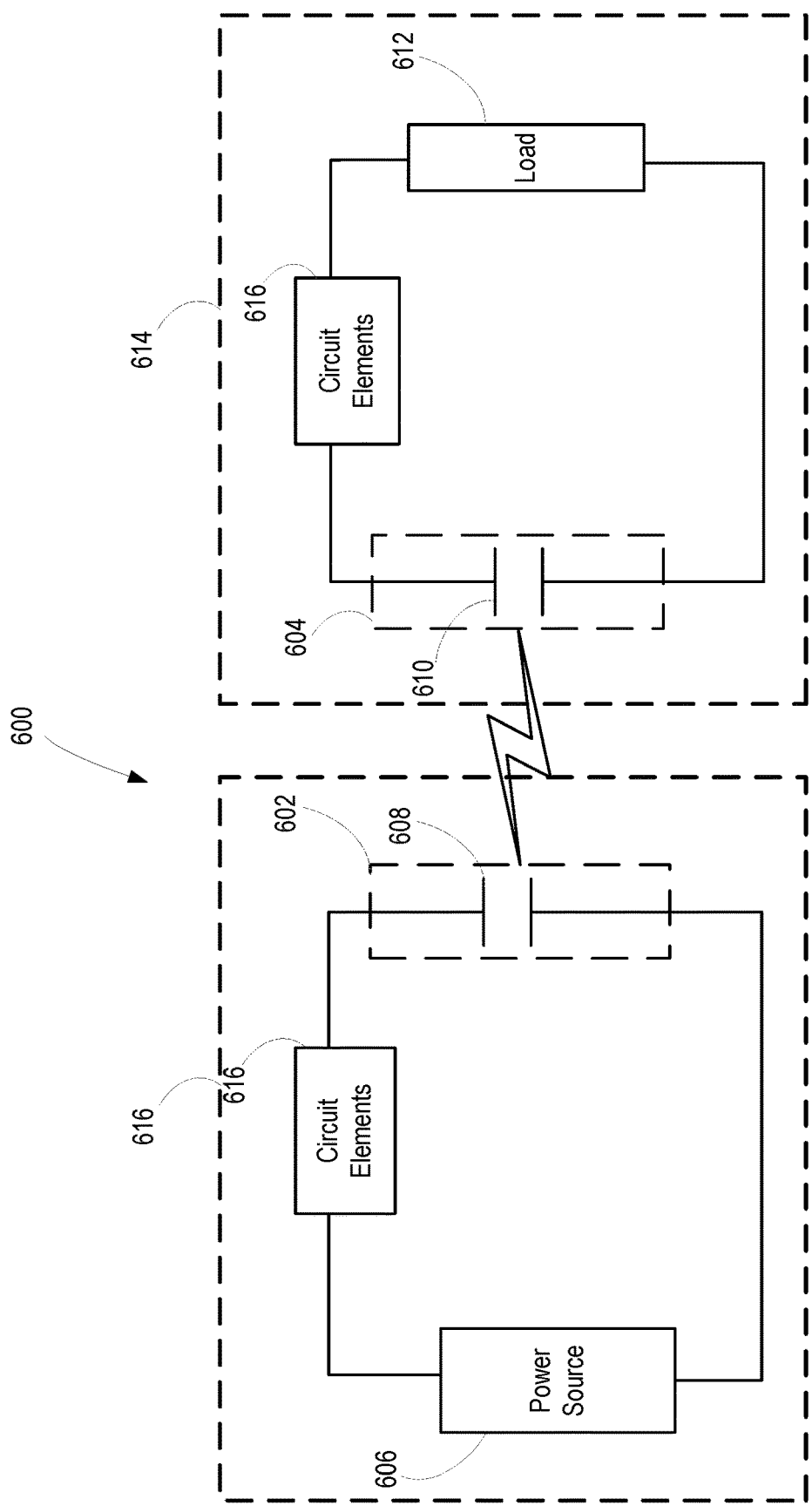
FIG. 6A to 6B is a simplified circuit diagram illustrating differential mode capacitive resonant coupling, according to an example embodiment.
Figure 6B:
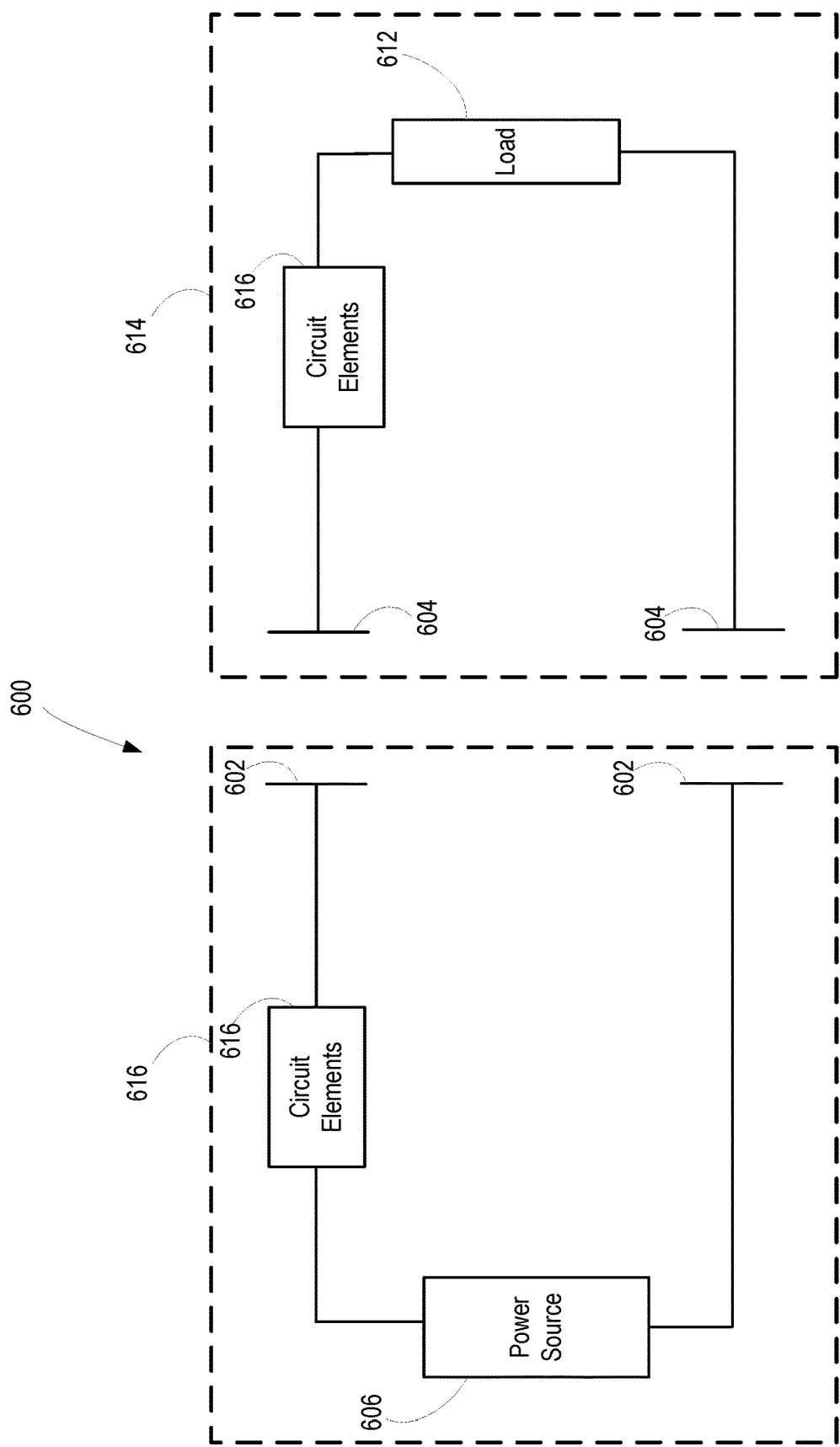

FIGS. 6A and 6B illustrate a system 600, in two representations, which includes a differential mode capacitor, according to an exemplary embodiment. Each of transmit-resonator 602 and receive-resonator 604 may include at least one capacitor. Power source 606 may supply a signal oscillating at a system resonance frequency to transmit-resonator 602. Transmit-resonator 602 may resonate upon receiving the signal from source 606. As transmit-resonator 602 resonates, transmitter differential mode capacitor 608 may generate an electric field oscillating at the system resonant frequency. Receive-resonator 604, if in proximity to the transmit-resonator 602, may couple with the oscillating electric field. As such, a wireless resonant coupling link may be established between the transmitter and the receiver. Furthermore, receiver differential mode capacitor 610 may resonate, and may therefore generate a signal that may be delivered to load 612 coupled to receiver 614.

In example embodiments, a system may establish a wireless resonant coupling link between a transmitter and a receiver according to one or more coupling modes that include a capacitive resonant coupling mode and an inductive resonant coupling mode. A transmitter and a receiver may each include the resonators necessary to establish a wireless link in each of the coupling modes. Furthermore, a wireless coupling link may be maintained between the transmitter and the receiver that utilizes different coupling modes simultaneously or individually. In some examples, the resonators may include a single circuit element that may be configured to operate either as an inductor, a capacitor, or both. In an example, an element may include coils shaped like a pair of conductor plates, such that the element may operate as an inductor and/or a capacitor. In other examples, a transmitter or receiver may include multiple resonators arranged in a resonator bank. The resonator bank may include at least one resonator that may include an inductor, and at least one resonator that may include a capacitor. Accordingly, the resonator bank may be configured to establish wireless resonant coupling links in capacitive and inductive resonant coupling modes.

Figure 7:
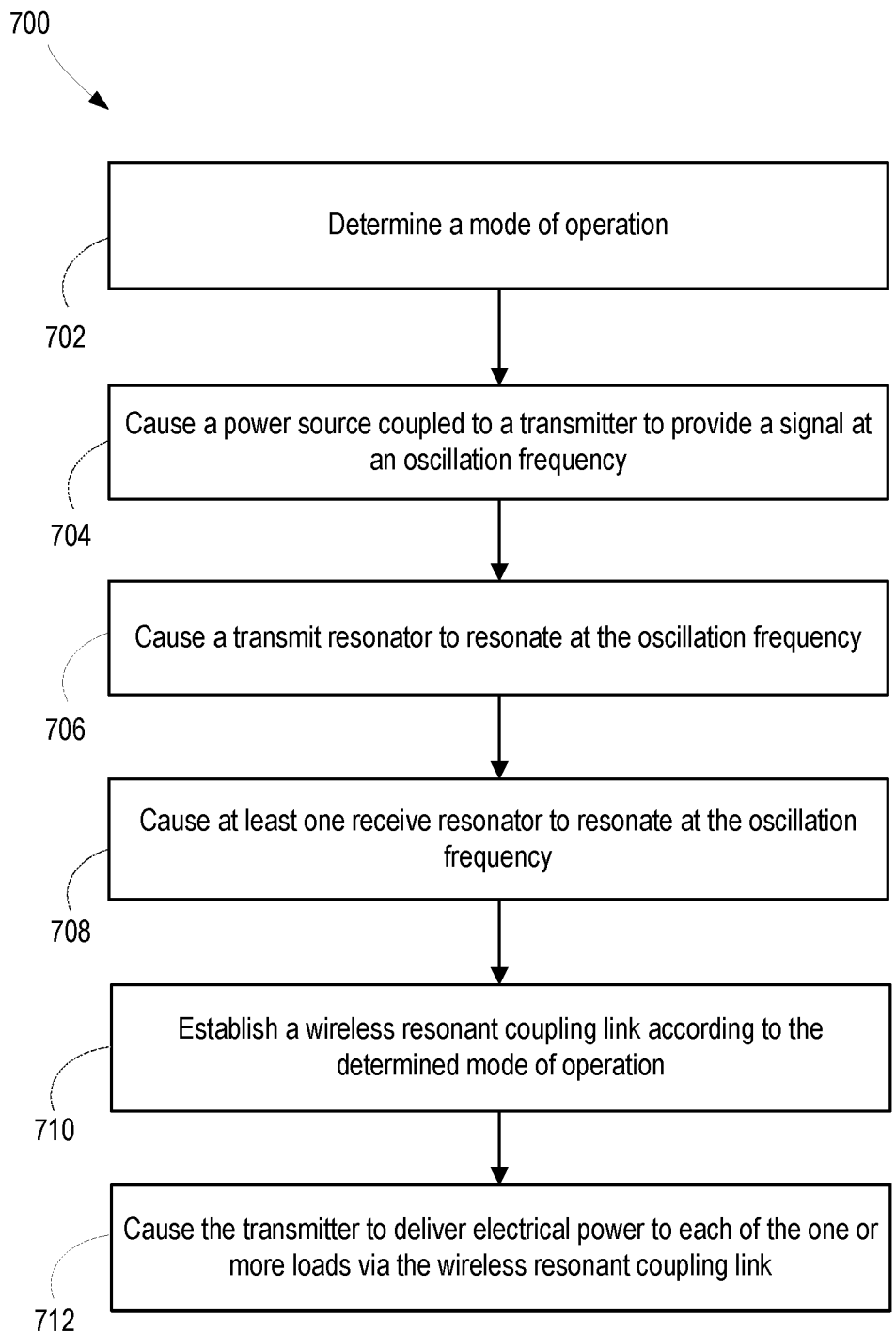
FIG. 7 illustrates a method of delivering electrical power from a transmitter to one or more loads, according to an example embodiment.

FIG. 7 illustrates a flowchart showing a method 700 that may establish a wireless resonant coupling link between a transmitter and a receiver of a system, according to an exemplary embodiment. In some embodiments, method 700 may be carried out by a controller of a system.

Furthermore, as noted above, the functionality described in connection with the flowcharts described herein can be implemented as special-function and/or configured general-function hardware modules, portions of program code executed by one or more processors for achieving specific logical functions, determinations, and/or steps described in connection with the flowchart shown in FIG. 7. For example the one or more processors may be part of controller 114. Where used, program code can be stored on any type of non-transitory computer-readable medium, for example, such as a storage device including a disk or hard drive.

In addition, each block of the flowchart shown in FIG. 7 may represent circuitry that is wired to perform the specific logical functions in the process. Unless specifically indicated, functions in the flowchart shown in FIG. 7 may be executed out of order from that shown or discussed, including substantially concurrent execution of separately described functions, or even in reverse order in some examples, depending on the functionality involved, so long as the overall functionality of the described method is maintained.

As shown by block 702, of FIG. 7, method 700 may involve determining an operational state of a system. The determined operational state may include at least one coupling mode. For example, the determined operational state may include any of the wireless coupling modes described herein. Within examples, the determined operational state may be determined by a controller of the system. As shown by block 704, method 700 further includes causing a power source that is coupled to a transmitter of a system to provide a signal at an oscillation frequency. For example, the oscillation frequency may be one of the one or more resonant frequencies of the transmitter. In some embodiments, the oscillation frequency may be a frequency within a range of resonant frequencies of the transmit-resonator.

Accordingly, as shown by block 706, a transmit-resonator may resonate at the oscillation frequency upon receiving the signal from the power source of the system. The oscillating transmit-resonator may generate a field oscillating at the oscillation frequency. In some embodiments, the transmit-resonator may generate a field that may be oscillating at a frequency within a range of resonant frequencies of the receive-resonator. As shown by block 708, if a receive-resonator is located within the range of the oscillating field generated by the transmit-resonator, the receive-resonator may also resonate at the oscillation frequency. As a result, as shown by block 710, a wireless resonant coupling link may be established according to the determined operational state. Finally, method 700 may cause the transmitter to deliver electrical power to each of the one or more loads via the established wireless resonant coupling link, as shown by block 712.

FIG. 8 illustrates different combinations of coupling modes that may form wireless resonant coupling link, according to an exemplary embodiment. In an example embodiment, a system may include a transmitter and a receiver both having three different types of resonator elements (e.g. an inductor, a common-mode capacitor, and a differential-mode capacitor). Accordingly, a wireless resonant coupling link between the transmitter and the receiver may include various combinations of the three different coupling modes. Accordingly, combinations 1-7 each include supporting a wireless resonant coupling link via at least one coupling mode. Operational state 8 represents when the system is not operating or when the transmitter and receiver are not coupled via a wireless resonant coupling link. Within examples, the various combinations of coupling modes forming the wireless coupling link between the transmitter and the receiver may be determined and controlled by a controller. In other examples, a user may provide an input to the controller that may direct the system to form a wireless resonant coupling link with a given combination of coupling modes.

In an example embodiment, a system may establish wireless resonant coupling links between a transmitter and a plurality of receivers. In such a scenario, the plurality of receivers may all operate in a single operational state to establish simultaneous links to the transmitter. In other scenarios, each of the receivers may establish a wireless resonant coupling link with the transmitter using a different coupling mode. Transmitters of such systems may include a resonator bank configured to enable simultaneous links with a plurality of receivers via one or more coupling modes.

As explained elsewhere herein, a system may employ time division multiple access (TDMA) to establish a wireless resonant coupling link that may be shared by a plurality of receivers. Specifically, the wireless resonant coupling link may be divided into different time slots within a given time frame. As such, each receiver of the plurality of receivers may receive electrical power from the transmitter during an assigned time slot within the given time frame. In other words, within the given time frame, the transmitter may distribute power to a given receiver during a given time slot. Each receiver may be assigned to receive power during one or more time slots within the time frame.

Figure 9A:
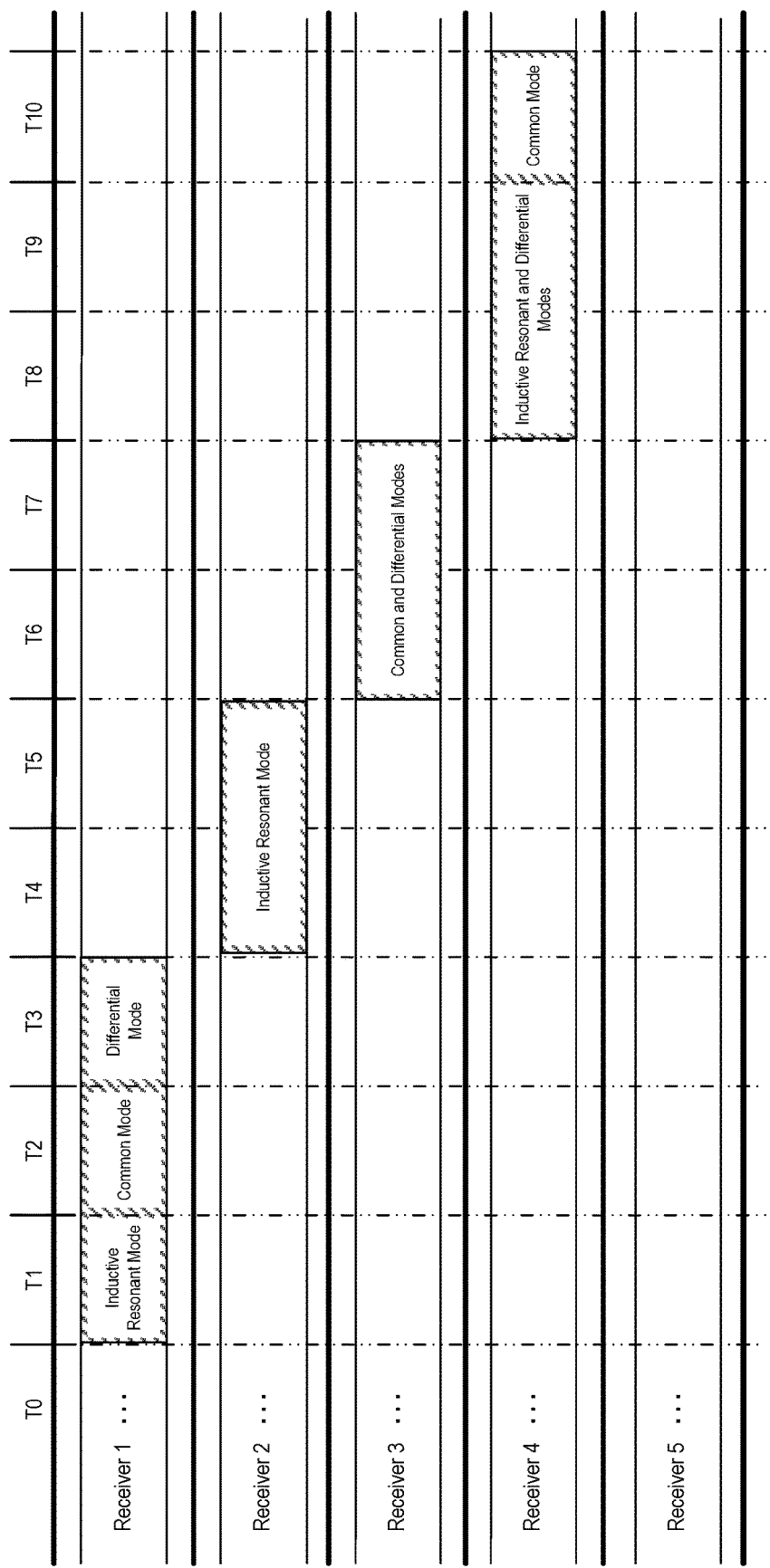
FIG. 9A to 9B illustrate a TDMA wireless resonant coupling channel, according to an example embodiment.

FIG. 9A illustrates a TDMA wireless resonant coupling link, according to an exemplary embodiment. Specifically, the ten time slots (T1-T10) may represent a single time frame of power distribution. The same distribution may be repeated in subsequent time slots T11-T20 and/or time frames (not shown). Furthermore, a controller of the system may assign each receiver of the system one or more time slots during which the receiver may receive power from the transmitter. In this example, receivers 1-4 are configured to receive power from the transmitter during various time slots of this time frame, whereas receiver 5 is not configured to receive power. In such a scenario, a controller may assign receivers 1-4 specific time slots during which they may receive power from the transmitter. The power may be transferred to a receiver during a given time slot according to any of the modes of operation of a system. Within examples, the controller may determine the operational state (e.g., the coupling mode type(s)) of each receiver during each interval of time. In other examples, the operational state may be input by a user of the respective receiver.

Figure 9B:
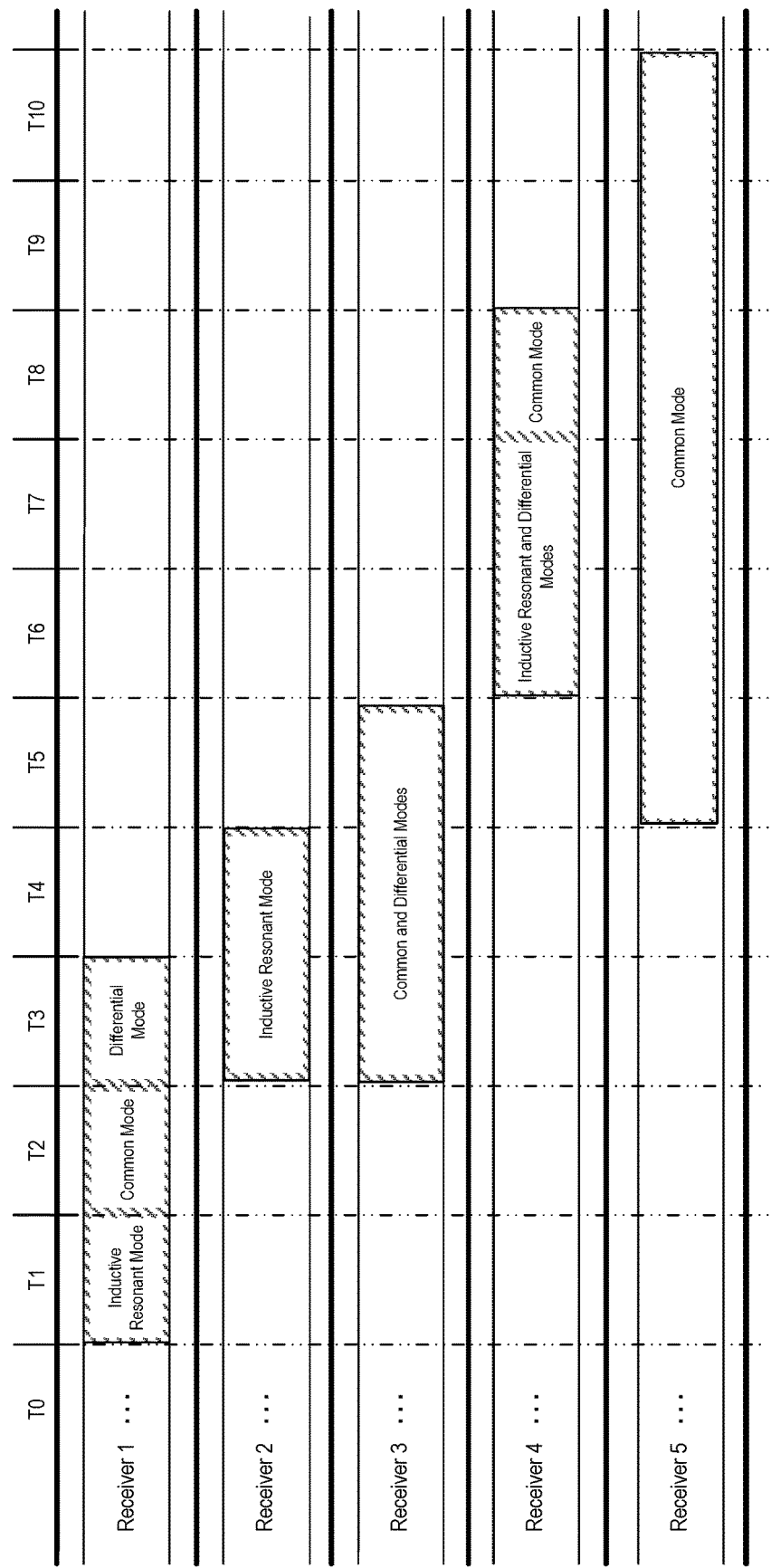

FIG. 9B illustrates a TDMA wireless resonant coupling link, according to an exemplary embodiment. Similar to the system illustrated in FIG. 9A, the ten time slots (T1-T10) may represent a single frame of power distribution. However, as illustrated in FIG. 9B, more than one receiver may receive power simultaneously from the transmitter. Furthermore, each receiver may receive power according to any of the modes of operation of the system. In some examples, the receivers receiving power simultaneously may receive power according to the same mode of operation. In other examples, the receivers receiving power simultaneously may receive power according to different modes of operation.

In accordance with some embodiments, the components (e.g., transmitter and receiver) of a system may include circuit elements (shown as element 212 in FIG. 2, element 414 in FIG. 4, element 524 in FIG. 5, and element 616 in FIG. 6), such as inductors, capacitors, transistors, inverters, amplifiers, rectifiers, varactors, relays, diodes, transmission lines, resonant cavities and switches, which may be arranged to facilitate switching between the different coupling modes of a system. For example, a system may switch between the different modes by having both a coil and one or two (or more) conductors in a combination of series-parallel connections. In other examples, a system may dynamically suppress or enhance a coupling mode by dynamically adding lumped element reactive components in series or parallel between the elements of the resonator of each mode.

In some examples, the operational state of a system may be determined by a controller of the system. For example, a controller may determine the mode of the operation of the system based on data that it may receive from a receiver, such as the receiver's power demands, preferred operational state, and location. Alternatively or additionally, the controller may determine the operational state based on data that may be input by a user of the system. Furthermore, the operational state may be determined based on the status of the system and/or environmental conditions.

In some embodiments, a controller may switch the operational state in response to detecting a parasitic device (using methods described herein) that may be diverting power from a legitimate receiver. In an example, a system may be operating in a state that utilizes common mode resonant coupling. However, a controller may detect a parasitic device that may also be coupled to the transmitter using common mode. In response, the controller may stop wireless power delivery via the common mode, and may enable wireless power delivery via a differential capacitive coupling mode, an inductive resonant coupling mode, or both. In other embodiments, a controller may use environmental conditions to determine the system's operational state. For example, a controller may receive information indicative of a presence of high ferrite content objects in the system's environment. Accordingly, the controller may determine to operate in a mode that does not utilize inductive resonant coupling mode.

A controller may also determine an amount of electrical power that a system may deliver to each load in the system. The controller may also make a determination of how much electrical power to deliver to each load via each available coupling mode in the system. Accordingly, in an example, the controller may cause the power source to direct the determined amount of power to a resonator bank and further control the delivery of power to the respective receivers via the respective determined coupling modes.

Furthermore, external elements may be installed in a system's environment, which may be configured to improve or otherwise modify the performance of the system. In some embodiments, field concentrators may be configured to shape an oscillating magnetic field (of an inductive resonator), an oscillating electric field (of a capacitive resonator), or both. For example, high permeability materials, such as ferrites, may be installed in a system's environment. In an example embodiment, while the system is operating in inductive resonant coupling mode, the high permeability material may be arranged so as to shape the oscillating magnetic field and extend its range. Similarly, high permittivity dielectric materials may be arranged in a system's environment. A capacitor of the system may utilize the high permittivity dielectric materials to increase or otherwise modify its capacitance, and hence adjust the properties of the electric field produced by a resonant capacitor. Furthermore, conductors may also be arranged in a system's environment so as to affect the magnetic and/or the electric field produced by the system's resonators.

Within examples, a system may include circuit elements that may be used as necessary in the system to implement the system's functionality. For example, a system may include circuit elements such as inverters, varactors, amplifiers, transmission lines, resonant cavities rectifiers, transistors, switches, relays, capacitors, inductors, diodes, and conductors. A relay may be used for switching between circuit elements configured to operate each coupling mode. As explained herein, a switch may connect a load to a receiver, such that the load is switchably coupled to the receive-resonator. Other examples of possible uses for various circuit elements are possible.

B. Power Transfer to Legitimate Receiver(s)

Figure 10:
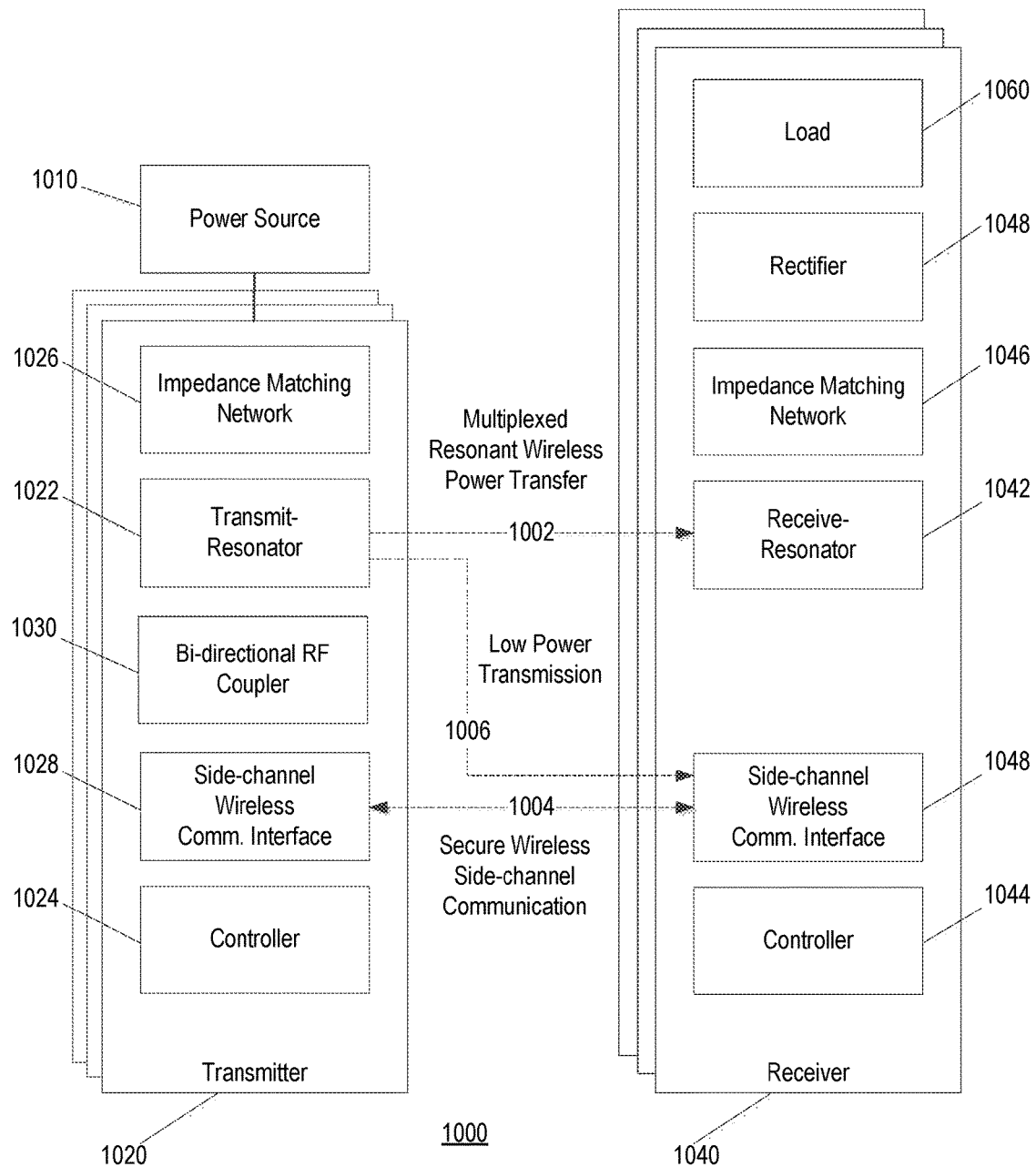
FIG. 10 is a functional block diagram illustrating a wireless power delivery system employing side-channel communications, according to an example embodiment.

FIG. 10 illustrates a resonant wireless power delivery system 1000 according to an example embodiment. The system 1000 includes a power source 1010, a transmitter 1020, and a receiver 1040. The transmitter 1020 receives power from the power source 1010 and wirelessly transfers this power to the receiver 1040. The transmitter 1020 may be one of a plurality of transmitters. The receiver 1040 is one of a plurality of receivers that may receive power from the transmitter 1020.

The transmitter 1020 includes a transmit-resonator 1022, and the receiver 1040 includes a receive-resonator 1042. The transmit-resonator 1022 is supplied with a power signal from the power source 1010 oscillating at a resonant frequency $\omega 0$. As described above, the transmit-resonator 1022 resonates at the resonant frequency $\omega 0$ and generates a field that oscillates at the resonant frequency $\omega 0$. The receiver-resonator 1042 is correspondingly configured to resonate at the resonant frequency $\omega 0$. The receiver 1040 is placed in sufficient proximity to the transmitter 1020 to couple the receive-resonator 1042 with the field generated by the transmit-resonator 1022, e.g., the receiver-resonator 1042 is within the field of the transmit-resonator 1022 depending for instance on the quality factor Q as described above. This coupling establishes a resonant power transfer link 1002 that provides a wireless conduit for power transfer between the transmit-resonator 1022 and the receive-resonator 1042. As also described above, the transmit-resonator 1022 and the receive-resonator 1042 may be coupled via an oscillating magnetic field and/or an oscillating electric field. In particular, the coupling may include any one or more of the following three modes: (i) inductive mode, (ii) differential capacitive mode, and (iii) common capacitive mode.

While the receive-resonator 1042 resonates in response to the oscillating field, a rectifier 1048 or other power conversion circuit may convert power from the receive-resonator 1042 and subsequently deliver the power to a load 1060. While the load 1060 is incorporated into the receiver 1040 as illustrated in FIG. 10, some embodiments may include loads that are physically separate or otherwise apart from the receiver 1040.

As shown in FIG. 10, the transmitter 1020 includes a controller 1024. In an example embodiment, the controller 1024 may determine what coupling mode(s) to employ and may control various elements of the transmitter 1020 so as to establish and/or maintain wireless resonant coupling links according to the determined coupling mode(s). The controller 1024 may also determine the amount of power that is transferred via the respective coupling mode(s).

As also described above, higher efficiencies can be achieved by adjusting impedances (resistance and/or reactance) on the transmitting side and/or the receiving side, e.g., impedance matching. Accordingly, the transmitter 1020 may include an impedance matching network 1026 coupled to the transmit-resonator 1022. Similarly, the receiver 1040 may include an impedance matching network 1046 coupled to the receive-resonator 1042.

In an example embodiment, a plurality of devices and objects may be present within a local environment of the transmitter 1020. In such a scenario, the example system 1000 may be configured to distinguish legitimate receivers from illegitimate devices that are not intended recipients of power transfer. Without an ability to discriminate between possible recipients of power transfer, illegitimate devices may act as parasitic loads that may receive power from the transmitter without permission. Thus, prior to transferring power to the receiver 1040, the transmitter 1020 may carry out an authentication process to authenticate the receiver 1040. In an example embodiment, the authentication process may be facilitated via a wireless side-channel communication link 1004.

The transmitter 1020 may include a wireless communication interface 1028 and the receiver 1040 may include a corresponding wireless communication interface 1048. In such a scenario, the transmitter 1020 and the receiver 1040 may establish a side-channel communication link 1004 via a wireless communication technology. For instance, classic BLUETOOTH® or BLUETOOTH® LOW ENERGY (BLE) (2.4 to 2.485 GHz UHF) or WIFI™ (2.4 GHz UHF/5 GHz SHF) may be employed to provide secure communications between the transmitter 1020 and the receiver 1040. Other wireless communication protocols are possible and contemplated. As shown in FIG. 10, the side-channel link 1004 communicatively couples the transmitter 1020 and the receiver 1040 over a secondary channel that is separate from the resonant power transfer link 1002. In alternative embodiments, however, the transmitter 1020 and the receiver 1040 may employ the same channel to transfer power and communicate information as described herein, e.g., by modulating aspects of the power transfer to communicate the information.

In an example embodiment the transmitter 1020 can communicate with the receiver 1030 over the side-channel communication link 1004 to determine that the receiver 1040 is authorized or otherwise permitted to receive power. The receiver 1040 may be configured to provide any type of information and/or acknowledgement required by the transmitter 1020 to authenticate the receiver 1040. For instance, the receiver 1040 may transmit an authentication code, a message, or a key to the transmitter 1020. In such scenarios, a device without the ability to establish side-channel communications with the transmitter 1020 may not be identified as a legitimate device.

The receiver 1040 may also include a controller 1044. As such, the controllers 1024, 1044 can conduct communications via the side-channel link 1004 and process the information exchanged between the transmitter 1020 and the receiver 1040.

As described above, when power is transferred from the transmitter 1020 to the receiver 1040, power may be reflected back to the transmitter 1020 As FIG. 10 illustrates, the transmitter 1020 may include a bi-directional RF coupler 1030 to measure the reflected power as also described above. Using measurements from the bi-directional RF coupler 1030, an optimal efficiency for the power transfer link 1002 may be ascertained, and the impedance(s) on the transmitting and/or receiving sides can be adjusted via the impedance matching networks 1026, 1046 so as to optimize or otherwise modify power delivery efficiency.

The impedance associated with the receiver 1040 may be determined based on the reflected power detected by measurement devices in conjunction with the bi-directional RF coupler 1030. If a nominal impedance (e.g., a designed impedance) of the receiver 1040 is known, a difference between the nominal impedance and the calculated impedance based on the measurement of reflected power may indicate a presence of one or more parasitic loads. Such parasitic loads may include illegitimate receivers. Using the side-channel communication link 1004 established between the transmitter 1020 and the receiver 1040, the receiver 1040 may be operable to communicate its nominal impedance to the transmitter 1020. Thus, the calculation of impedance using the bi-directional RF coupler 1030 may enable the identification of parasitic loads as well as enable dynamic impedance matching as disclosed elsewhere herein. The impedance(s) of the transmitter 1020 and/or the receiver 1040 can be adjusted via the impedance matching networks 1026, 1046 to account for the parasitic loads.

As described herein, the transmitter 1020 may be operable to identify the existence of the legitimate receiver 1040 through authentication communications via the side-channel communication link 1004. Additionally or alternatively, the transmitter 1020 may be operable to distinguish the legitimate receiver 1040 from other legitimate or illegitimate devices by other methods. In particular, the transmitter 1020 may be operable to control the power transfer link 1002 and the communication over the side-channel communication link 1004 with the same receiver 1040.

The side-channel communication link 1004 may be employed to identify and authenticate the receiver 1040 and to establish and adjust aspects of the power transfer link 1002, particularly to account for parasitic loads. Specifically, the side-channel communication link 1004 and the power transfer link 1002 may enable a variety of authentication protocols so as to provide secure communications and power delivery. For example, the transmitter 1020 and receiver 1040 may be operable to conduct a password authentication protocol (PAP), a challenge-handshake authentication protocol (CHAP), multi-factor authentication, or another type of cryptographic protocol. In general, however, the transmitter 1020 and the receiver 1040 may employ the side-channel communication link 1004 to exchange any type of information to manage any aspect of the power transfer link 1002.

In an example embodiment, the system 1000 may help ensure the availability of the side-channel communication link 1004 by intermittently or continuously transmitting a certain amount of power via a predetermined wireless resonant coupling link configuration. This transmission 1006 can power the wireless communication interface 1048 and allow it to remain active even if other aspects of the receiver 1040 do not receive power. As such, the receiver 1040 may receive sufficient power to establish initial communications with the transmitter 1020. Thereafter, the receiver 1040 may establish the power transfer link 1002. For instance, the transmission 1006 may provide a low power, e.g., approximately 1 W. In such a scenario, the power distribution efficiency of the transmission 1006 is less of a concern at relatively low powers.

As described above, the controller 1024 may determine what coupling mode to employ in the example system 1000. The controller 1024 may select coupling mode(s) based on the identification of parasitic loads. For instance, the transmitter 1020 may deliver power to the receiver 1040 via a common capacitive mode during a first time period. However, subsequent to the first time period, the controller 1024 may detect a parasitic device that may also be coupled to the transmitter 1020 via common capacitive mode. Consequently, the controller 1024 may cause the transmitter 1020 and/or the receiver 1040 to a switch to differential capacitive mode and/or inductive mode.

C. Wireless Power Adapter

Within embodiments, the wireless power receiver may be integrated with electronic devices in a variety of ways. For instance, a wireless power receiver may be incorporated into a given electronic device during the manufacture of the device. In such a scenario, the wireless power receiver may be configured to receive an amount of power, which at least meets or exceeds the power requirements of the device, from a wireless power transmitter. Further, the wireless power receiver may be configured to provide the device with power according to the device's requirements. Accordingly, the device may be integrated with a wireless power system without calibrating the device.

As explained above, many electronic devices currently in use may receive power via a legacy power cord that is directly coupled (e.g., hard-wired) to a power source. The electrical connection that couples the power source to the legacy device may include a legacy electrical cord or cable that couples to between the legacy device and an outlet of the power source (e.g., AC mains wall outlet). The electrical connection that couples a power source to a legacy device may also include an electrical wire (e.g., a wire that couples between a battery and the legacy device).

Figure 11:
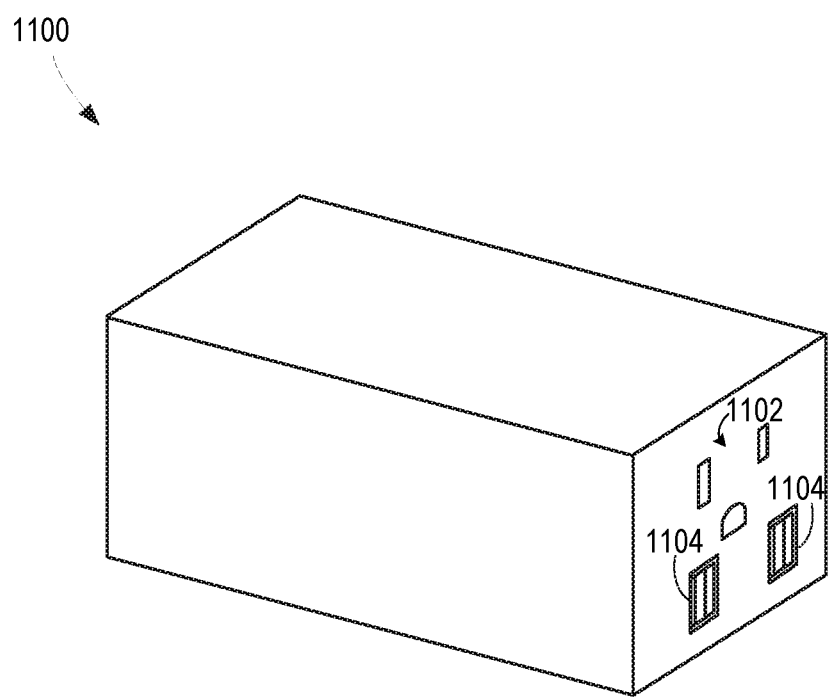
FIG. 11 illustrates a wireless power adapter, according to an example embodiment.

FIG. 11 illustrates a wireless power adapter 1100, according to an exemplary embodiment. As explained above, the wireless power adapter can be coupled with a legacy device in order to supply the device with electrical energy that the device receives wirelessly. The electrical energy may then be used to directly power the legacy device or to charge a battery of the device. As illustrated in FIG. 11, the wireless power adapter may include one or more electric coupling members that can be used to couple the adapter to legacy devices. In this embodiment, the electric coupling members may be different types of outlets that can receive legacy power prongs. The wireless power adapter 1100 includes electric coupling members 1102 and 1104. An electric cord with a two-prong or three-prong terminal may couple with the electric coupling member 1102. The electric coupling member 1104 is a female USB port that can receive a male USB terminal of an electric wire. As discussed elsewhere herein, other types of electric coupling members are also possible.

In an embodiment, a user may couple the wireless power adapter 1100 to a legacy device using the electric coupling members of the wireless power adapter 1100. For example, the user may plug the power cord of the legacy device into one of the electric coupling members of the wireless power adapter 1100. The wireless power adapter 1100, which also includes a wireless power transceiver or receiver (not illustrated in FIG. 11), may then receive power from a wireless power transmitter. Then, the wireless power adapter 1100 may deliver the received power to the legacy device via the power cord that is coupled to the wireless adapter 1100.

However, different types of legacy devices have different power requirements (e.g. different power ratings). Therefore, although the adapter 1100 may be coupled to any legacy device that includes a legacy cord, the adapter 1100 may need to be calibrated in order to provide a specific type of electronic device with the power it needs to function properly. One solution may be to manufacture wireless adapters that are each configured to provide power to a particular type of legacy device. A consumer may then purchase the wireless power adapter that works with the specific type of legacy device that the consumer wishes to power wirelessly.

This solution, although viable, may not be attractive from a consumer's perspective because the consumer would need to purchase a different adapter for each type of legacy device that they own. Furthermore, assuming the consumer purchases an adapter for each of their portable device (e.g., laptop, mobile phone, tablet, etc.), the consumer would need to carry each of the adapters in addition to the legacy cords in order to charge devices on the go.

For at least these reasons, it may be more useful, at least from a consumer's standpoint, for a wireless adapter to be "universally" compatible with more than one type of legacy device. However, in order for the wireless adapter to be compatible with legacy devices that have different power requirements, the wireless adapter may need to be calibrated to provide each type of legacy device with its respective power requirements.

Disclosed herein is a wireless adapter that can be calibrated to power different types of legacy devices. Also disclosed herein is a method of calibrating the wireless adapter to power the particular type of legacy device to which the wireless adapter is coupled.

Figure 12:
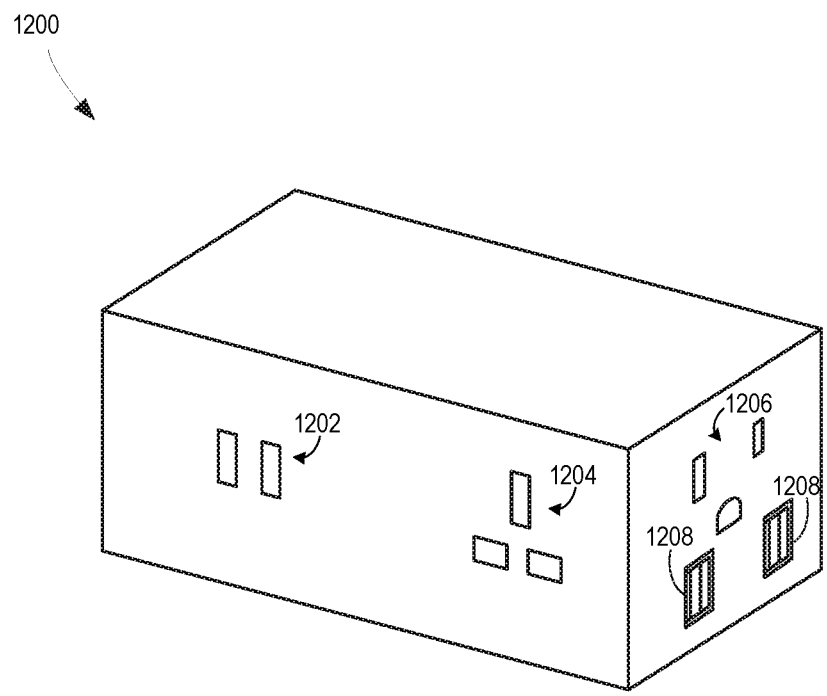
FIG. 12 illustrates another wireless power adapter, according to an example embodiment.

FIG. 12 illustrates a universal wireless adapter 1200, according to an exemplary embodiment. The wireless adapter 1200 includes electrical coupling members 1202, 1204, 1206, and 1208. A two-prong electric cord may couple with the electrical coupling members 1202 and 1206. A three-prong electric cord may couple with the electrical coupling members 1204 and 1206. The electrical coupling member 1208 is a female USB port that can receive a male USB terminal of an electric wire. Other types of electrical coupling members that may be included in the adapter 1200 include sockets that can couple with Europlugs (e.g., European CEE 7/16 plugs), coaxial power connectors, electric car charging standard plugs (SAE J1772), power cables that carry single phase or multiphase power signal (e.g., three-phase 208 V), a micro USB, bare-wires (banana plugs, spring connections), and NEMA plugs (e.g., twist-lock plugs, grounded plugs, ungrounded plugs, etc.).

Figure 13A:
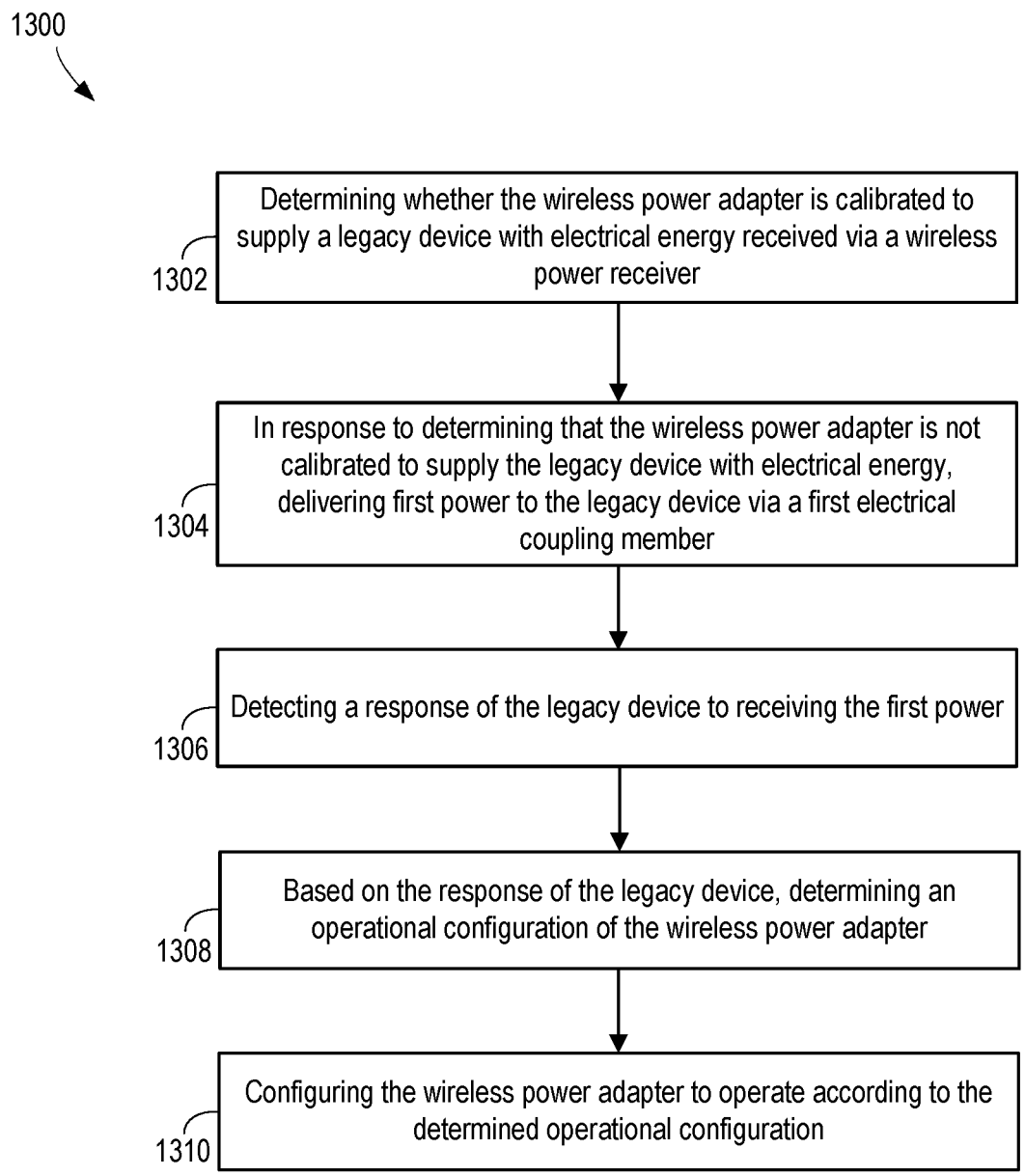
FIG. 13A illustrates a method of determining an operational configuration of a wireless adapter, according to an example embodiment.

FIG. 13A illustrates a flowchart showing a method 1300 that may determine an operational configuration of a wireless adapter, according to an exemplary embodiment. The operational configuration of the wireless power adapter may define characteristics of the power signal (e.g., peak power, average or RMS power, voltage, current, transient response, etc.) that is delivered to a device coupled to the adapter. The operational configuration may also define the mode of operation of the wireless power receiver included in the adapter. Therefore, by determining the operational configuration of the wireless adapter, the adapter is calibrated to provide power to the device to which it is coupled.

Figure 13B:
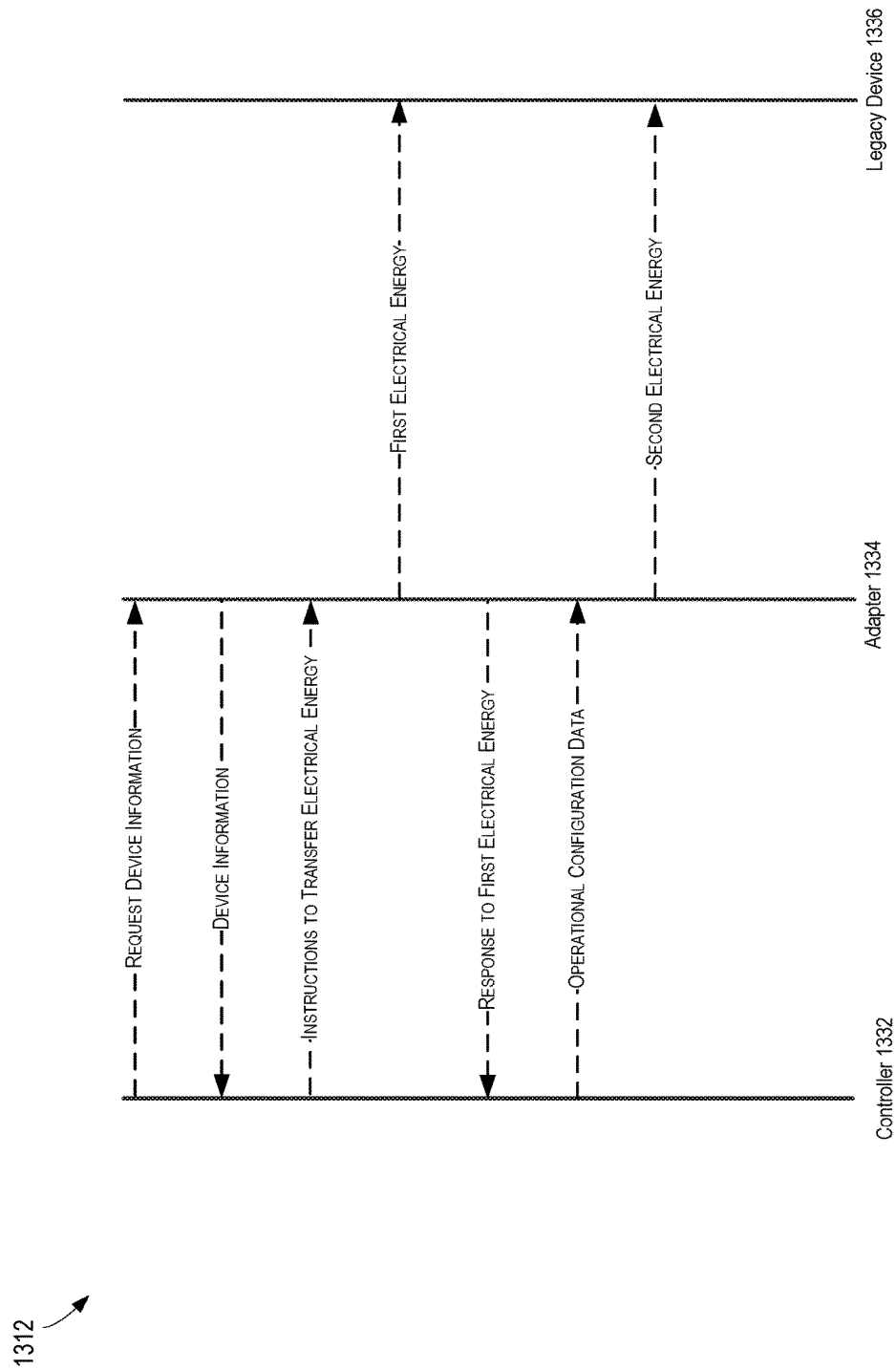
FIG. 13B illustrates communication between a controller, a wireless power adapter, and a legacy device, according to an example embodiment.

FIG. 13B illustrates a representation of an interface between a wireless adapter 1334, a legacy device 1336, and a controller 1332, when the controller 1332 is performing the method 1300. Note that FIG. 13B depicts the controller 1332 as a separate entity from the adapter 1334. In some instances, the controller 1332 may be a separate entity from the adapter 1334, such as when the controller is a controller of the wireless power system. However, in other instances, the controller 1332 may be the controller of the adapter 1334.

As noted above, the functionality described in connection with the flowcharts described herein can be implemented as special-function and/or configured general-function hardware modules, portions of program code executed by one or more processors for achieving specific logical functions, determinations, and/or steps described in connection with the flowchart shown in FIG. 13A. For example the one or more processors may be part of controller 113 of FIG. 1. In another example, the one or more processors may be the processors 1802 in FIG. 18. Where used, the program code can be stored on any type of non-transitory computer-readable medium, for example, such as a storage device including a disk or hard drive.

In addition, each block of the flowchart shown in FIG. 13A may represent circuitry that is wired to perform the specific logical functions in the process. Unless specifically indicated, functions in the flowchart shown in FIG. 13A may be executed out of order from that shown or discussed, including substantially concurrent execution of separately described functions, or even in reverse order in some examples, depending on the functionality involved, so long as the overall functionality of the described method is maintained.

In an implementation, the controller 1332 may perform the method 1300 in response to detecting that the adapter 1334 is coupled to the legacy device 1336. As described below, the method 1300 may also involve receiving power from a power source. In such embodiments, the controller 1332 may perform the method 1300 in response to detecting that the adapter 1334 is coupled to the legacy device 1336 and the power source. If the controller 1332 detects that the adapter is coupled to the legacy device 1336 but not to the power source, the controller 1332 may output a notification indicating that the adapter 1334 is not coupled to the power source.

The adapter 1334 may be coupled to the adapter 1334 and the power source via respective legacy power cords. For example, the legacy cords of each of the legacy device 1336 and the power source may be coupled to the adapter 1334 via respective electrical coupling members. Within examples, the power source may be AC mains that supplies AC power via an outlet (e.g., a legacy wall outlet). Other examples of power sources are also possible. For instance, the power source may be a battery that supplies DC power.

Furthermore, in some embodiments, the adapter 1334 may have registered and/or synchronized with a wireless power system before performing the method 1300. Additionally and/or alternatively, the adapter may be coupled to a computing device (e.g., a mobile device) that provides the wireless adapter with instructions (e.g., commands received from the user). Additionally, where the legacy device 1336 is a "smart device" that has communication capabilities, the adapter 1334 may also establish a communication channel (e.g., via a back-channel) with the legacy device 1336 when coupling to the device 1336. The communication channel may be a wired or wireless communication channel.

As shown by block 1302 of FIG. 13A, the method 1300 includes determining whether the wireless power adapter is calibrated to supply a legacy device with electrical energy received via a wireless power receiver. As illustrated in FIG. 13B, the controller 1332 may determine whether the adapter 1334 is calibrated to supply the legacy device by requesting device information from the adapter 1334. Within examples, the controller 1332 may request the device information of the adapter 1334 and/or the legacy device 1336. In response, the adapter 1334 may provide the controller 1332 with its information, such as a model number, a serial number, a MAC address, and/or any other type of identifying information. In examples where the legacy device 1336 is a smart device, the controller 1332 may also send a request for identification to the legacy device 1336.

Based on the type of the adapter 1334 and the type of the legacy device 1336, the controller 1332 may determine whether the adapter 1334 is calibrated to supply the legacy device 1336 with electrical energy. In an example, the controller 1332 may determine whether the adapter 1334 has calibration data of the legacy device 1336. The adapter 1334 may have been coupled to a device of the same type as the legacy device 1336, and therefore has already been calibrated to provide the legacy device 1336 with electrical energy. Additionally and/or alternatively, the controller 1332 may determine the calibration data from an external source based on the type of the adapter 1334 and/or the type of the legacy device 1336. For instance, the controller 1332 may retrieve the calibration data from a remote server (e.g., a cloud server). Other examples of external sources of calibration data may be possible. For instance, a user may provide the calibration data to the controller 1332 via a computing device.

Conversely, if the controller 1332 determines that it has not previously been calibrated to supply the legacy device with electrical energy, that it does not have access to the calibration data of the adapter 1334, and/or that it was not able to identify either the legacy device 1336 or the adapter 1334, the controller 1332 may determine that the adapter 1334 is not calibrated to supply the legacy device 1336 with electrical energy. In response to determining that the adapter 1334 is not calibrated, the controller 1332 may also determine whether the adapter 1334 is coupled to a power source. If the adapter 1334 is not coupled to a power source, the controller 1332 will output a notification indicating the adapter 1334 is not coupled to the power source. For example, the notification may be to computing device that the user is using. Additionally and/or alternatively, the controller 1332 may output the notification via a visual indicator on the adapter 1334 (e.g., LED lights, LED screen, etc.).

As shown by block 1304 of FIG. 13A, the method 1300 may include in response to determining that the wireless power adapter is not calibrated to supply the legacy device with electrical energy, delivering first power to the legacy device via a first electrical coupling member. The adapter 1334 may receive the first power from the power source via the first electrical coupling member. As illustrated in FIG. 13B, the controller 1332 may send instructions to the adapter 1334 to transfer the first electrical energy to the legacy device 1336. As further illustrated in FIG. 13B, the adapter 1334 then routes the first electrical energy to the legacy device 1336.

In some examples, before receiving and routing the first electrical energy, the adapter 1334 may determine a nominal voltage and/or nominal power of the legacy device. If the adapter 1334 has identified the legacy device, the adapter 1334 may determine the nominal voltage and/or by requesting the information from a remote server. Alternatively, the adapter 1334 may request the information from a user (e.g., by sending a notification to the user's computer device).

Within examples, the first power delivered to the legacy device may be a test signal power signal. In some examples, the adapter 1334 may route the first power to the legacy device 1336 without modifying the first power. In other examples, the adapter 1334 may receive instructions from the controller 1332 to modify the first power before routing the power to the legacy device 1336.

In the example where the first power signal is not modified by the adapter, the test signal is the first power signal that is received from the power source. For example, if the power source is AC mains in North America, the test signal is an AC signal with 120 V and a frequency of 60 Hz.

Alternatively, in the example where the first power is modified, the adapter 1334 may set the features of the test signal by modifying the first power signal. For instance, the adapter 1334 may increase or decrease the voltage of the signal. Additionally and/or alternatively, the adapter 1334 may decrease the current of the first power signal. Within examples, the test signal may be a signal that starts at a certain power, voltage, or current that increases over a time period. Such test signals are "sweep" signals that sweep over a power, a voltage, and/or a current range. In another example, the test signal may be a pulsed power signal. The pulsed test signal may be a pulsed power signal that incrementally covers a power, a voltage, and/or a current range. In another example, the probe signal may be a sweep voltage signal that sweeps over a voltage range at different slew rates.

As shown by block 1306 of FIG. 13A, the method 1300 may include detecting a response of the legacy device to receiving the first power. In an embodiment, the adapter 1334 may detect the response of the legacy device 1336 to receiving the first power by measuring a current, voltage, and/or power output of the legacy device 1336 (or one or more components of the legacy device) in response to receiving the first power signal. For example, the adapter 1334 may measure a transient response of the legacy device 1336 in response to receiving the first power signal. In another example, the adapter 1334 may measure the current-voltage characteristic curves of the legacy device 1336 in response to receiving the first power. In yet another example, the adapter 1334 may detect the output waveform of the power, current, and/or voltage of the legacy device 1336 in response to receiving the first power signal.

The adapter 1334 may also detect current versus voltage curves at different slew rates. Yet further, the adapter 1334 may detect a longer-term or steady state response. Yet further, the adapter 1334 may detect a statistical response when the legacy device 1336 operates under normal operating conditions for the duration of a typical use session. In an example, the statistical response may be determined by the adapter 1334 detecting a response of the legacy device 1336 as the user operates the legacy device 1336. By way of example, if the legacy device 1336 is a computing device, the user may power on the computing device, use the computing device for a period of time, and then power off the computing device. In this example, the adapter 1334 may detect the response of the legacy device 1336 during this sequence of operations.

As illustrated in FIG. 13B, the adapter 1334 may then send data indicative of the detected response to the controller 1332. The controller 1332 may analyze the response of the legacy device 1336 to detect features of the response. For example, the controller 1332 may detect and analyze the functional form of the response to detect linearities or non-linearities in the response, for example. Additionally and/or alternatively, the controller 1332 may detect harmonics in the waveform of the response. Further, the controller 1332 may determine characteristics of the waveform of the response, such as the frequency of the waveform. In an embodiment, the controller 1332 may further analyze the device response by generating, based on the detected responses to the test signal(s), a histogram of waveform responses (e.g., current-voltage responses) over various time scales.

As shown by block 1308 of FIG. 13A, the method 1300 may include based on the response of the legacy device, determining an operational configuration of the wireless power adapter. In an embodiment, the controller 1332 may determine the operational configuration by identifying a type of legacy device 1336 based on the response of the legacy device 1336. The controller 1332 that identifies the type of legacy device 1336 or a component thereof may determine, based on the response of the legacy device 1336 and the type of the legacy device 1336, the power requirements (e.g., power rating) of the legacy device 1336. For example, the adapter may identify that that type of the legacy device 1336 includes a universal motor that runs on AC mains power input.

In an embodiment, the controller 1332 may identify the type of the legacy device 1336 by analyzing the response of the legacy device 1336. The controller 1332 may analyze patterns, harmonics, and/or the shape of a waveform of the response of the legacy device. The controller 1332 may then identify the legacy device 1336 (or a component thereof) by comparing the measured waveform of the response to known output waveforms of different types of legacy devices.

In an example, the controller 1332 may compare the voltage-current functional relationship (waveform) of the legacy device 1336 to known voltage-current functional relationship (waveforms) of power electronics. The controller 1332 may then determine the voltage-current functional relationship (waveform) of the legacy device is comparable to a known voltage-current functional relationship (waveform) of a specific power electronic device, such as a bridge rectifier. In another example, the controller 1332 may then compare the generated histogram of waveform responses to known waveform responses of known devices or known classes of devices. For instance, the controller 1332 may use pattern matching to compare the histogram of waveform responses to the known waveform responses in order to identify classes of devices. Note that the known waveform responses of known devices or known classes of devices may be stored in a database or on a remote server. The database may compile the waveforms from successful calibrations of devices in order to improve the pattern matching functionality.

Based on the response of the legacy device 1336 and/or the type of the legacy device 1336, the controller 1332 may determine an operational configuration of the adapter 1334 at which the adapter 1334 will provide power to the legacy device 1336 according to the legacy device's 1336 power requirements. For instance, in the example of the controller 1332 determining that the legacy device 1336 includes a bridge rectifier, the controller 1332 may also determine, based on the response of the rectifier, the power requirements of the rectifier. For instance, by determining that the legacy device 1336 includes a rectifier, the controller 1332 may determine that the input power into the legacy device 1336 is AC power. The controller 1332 may then select an operational configuration of the adapter 1334 that provides the rectifier with AC power at a particular voltage. In another instance, the controller 1332 may determine that the input power into the legacy device 1336 is AC power. The controller 1332 may then select an operational configuration of the adapter 1334 that provides the rectifier with DC power at a particular voltage, rather than AC power.

As shown by block 1310 of FIG. 13A, the method 1300 may include configuring the wireless power adapter to operate according to the determined operational configuration. As illustrated in FIG. 13B, subsequent to determining the operational configuration of the adapter 1334, the controller 1332 may send operational configuration data to the adapter 1334. Furthermore, as explained above, the operational configuration is indicative of the power that the legacy device 1336 requires for normal operation. As such, once the adapter 1334 is configured to operate in the determined operational configuration, the adapter will transfer a second power to the legacy device 1336. The second power may be the rated power of the legacy device 1336.

An example of an operational configuration of the adapter is an AC-AC configuration in which the adapter 1334 receives AC power and supplies AC power to the legacy device 1336. In this example, the wireless power transmitter of the wireless power system may amplitude modulate an RF carrier signal with a 60 Hz power signal. The transmitter can then transmit the RF signal to the wireless power receiver of the adapter 1334. The receiver may be tuned to the frequency of the carrier signal in order to receive the signal transmitted by the transmitter. In an implementation of the embodiment, the adapter 1334 elements may include a high Q coil and a low pass filter. The adapter 1334 may use these elements to receive the signal transmitted by the transmitter. The adapter 1334 may then demodulate the received signal to extract the 60 Hz AC power signal. The adapter 1334 may then regulate the AC signal to the rated voltage (e.g., 120 V) of the legacy device 1336.

In another implementation of the embodiment, the adapter 1334 may further include additional electrical elements such as communication elements that can be used to exchange information with the transmitter. The adapter 1334 may use the communication elements to establish a back-channel with the transmitter in order to exchange frequency information. The frequency information may be indicative of the precise frequency of the RF signal broadcast by the transmitter. Note that this type of receiver may operate with receiver-resonator coils that are not high Q since the receiver may precisely determine the frequency of the RF signal via the backchannel.

In another example configuration, the adapter 1334 may generate a DC signal from the signal that is received from the wireless power transmitter, and may supply AC power to the legacy device 1336. In this embodiment, the transmitter transmits electrical power via a high frequency RF signal to the receiver that generates a DC power signal. The adapter 1334 may include an inverter in order to change the signal from a DC signal to the AC signal that is then supplied to the legacy device 1336. The adapter 1334 may also include a bridge rectifier that can convert an AC input into a DC output. The adapter 1334 may use the bridge rectifier to provide the legacy device a regulated DC voltage. Furthermore, the adapter 1334 can include elements to "step up/down" the DC power for devices of different power requirements (e.g., phone vs laptop). Other configurations are possible and will become apparent to those of ordinary skill in the art by reading the detailed description herein.

Figure 14:
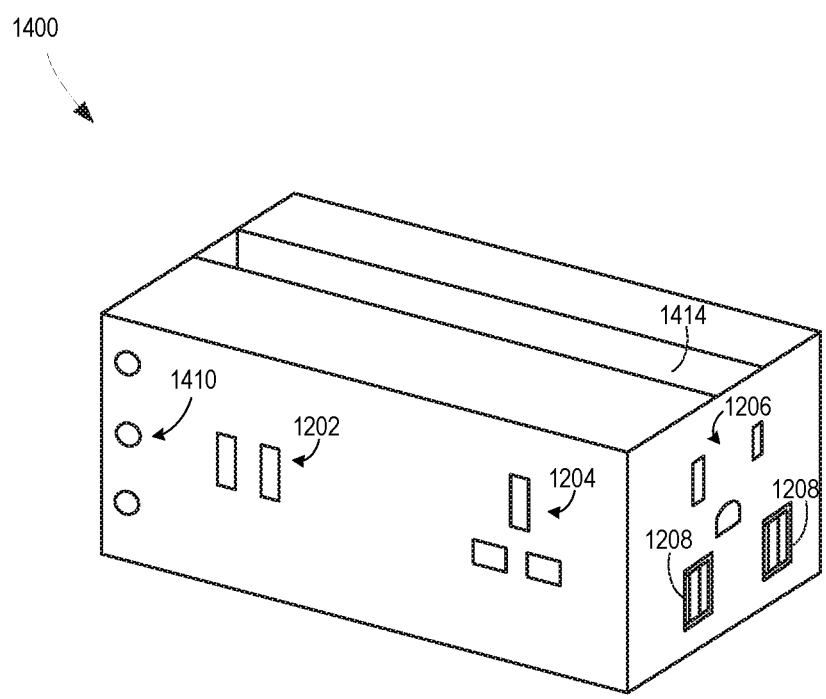
FIG. 14 illustrates another wireless adapter, according to an example embodiment.

FIG. 14, the wireless power adapter 1400 may include additional features to improve the functionality of the adapter 1400. For example, the wireless power adapter 1400 may include modular components. In an implementation, the modular components of the adapter 1400 may be power electronic modules that are used in some configurations and not others. Therefore, the power electronics that are not needed for a particular configuration may be swapped with power electronics that are needed for the configuration. As illustrated in FIG. 14, the adapter 1400 may include a port 1412 that can receive a power electronic module. Interchanging the power electronics of the adapter 1400 based on the operational configuration may allow for a more compact adapter as only the necessary are included in the device. Within examples, the power electronic modules may include rectifiers, inverters, transformers, converters, diodes, transistors, among other types of power electronics.

As illustrated in FIG. 14, the wireless power adapter 1400 also includes at least one LED 1410. The LED 1410 may be used as to provide a notification to a user of a status of the adapter 1400. For example, the LED 1410 may be indicative of a strength of the coupling between the wireless power receiver included in the adapter 1400 and the wireless power transmitter to which it is coupled. The adapter may adjust the brightness of the LED 1410 based on the strength of the coupling such that the brightness is proportional to the strength of the coupling. As such, a strong coupling factor is indicated by a brighter LED 1410 than a weaker coupling factor.

Therefore, after calibrating the legacy device, a user may adjust the position of the adapter to improve the coupling between the transmitter and the receiver. The user may use the LED to quickly and with relative accuracy determine where to place the adapter to improve the coupling factor. The LEDs 1410 may also be used to indicate the type of power electronic module to couple to the adapter 1400. For example, each possible configuration may have a color code associated with the configuration. The LEDs 1410 may emit that color in order to notify the user of the type of module to couple to the adapter 1400. Additionally and/or alternatively, each configuration may be associated with a number of LEDs that are illuminated. Other examples are possible.

Figure 15:
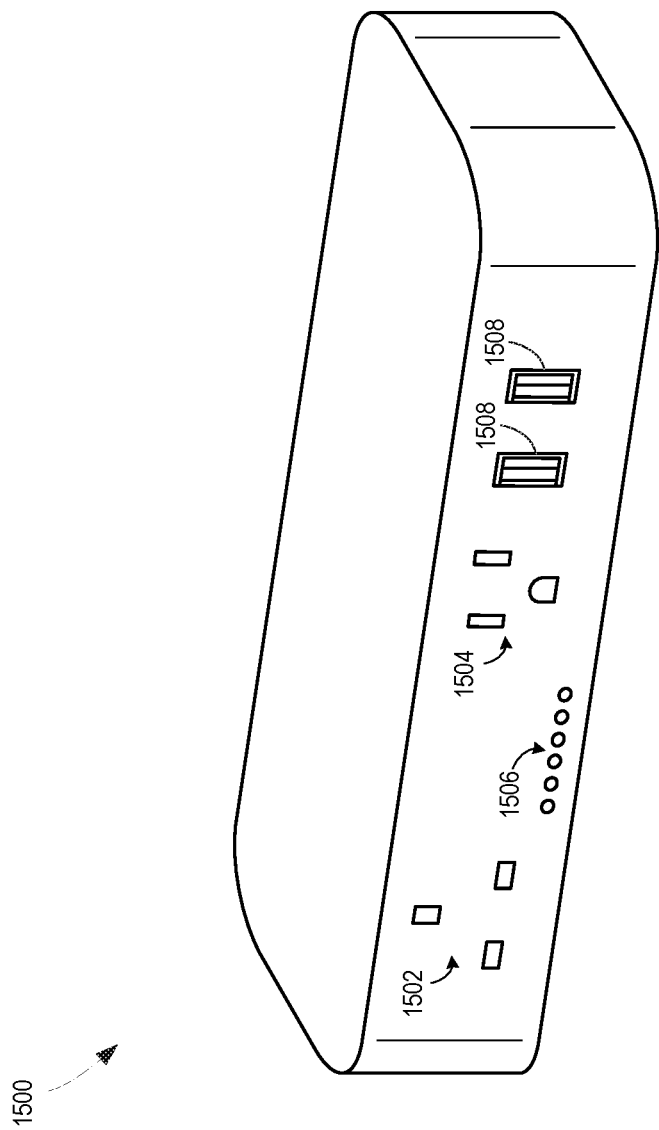
FIG. 15 illustrates another wireless adapter, according to an example embodiment.

FIG. 15 illustrates another wireless power adapter 1500, according to an exemplary embodiment. The adapter 1500 includes electrical coupling member 1502, 1504, and 1508. Further, the adapter includes LEDs 1506. In an embodiment, more than one legacy device may be coupled to the adapter 1500. The adapter may calibrate each of the legacy devices in order to provide each legacy device with power according to its respective power requirements.

Figure 16:
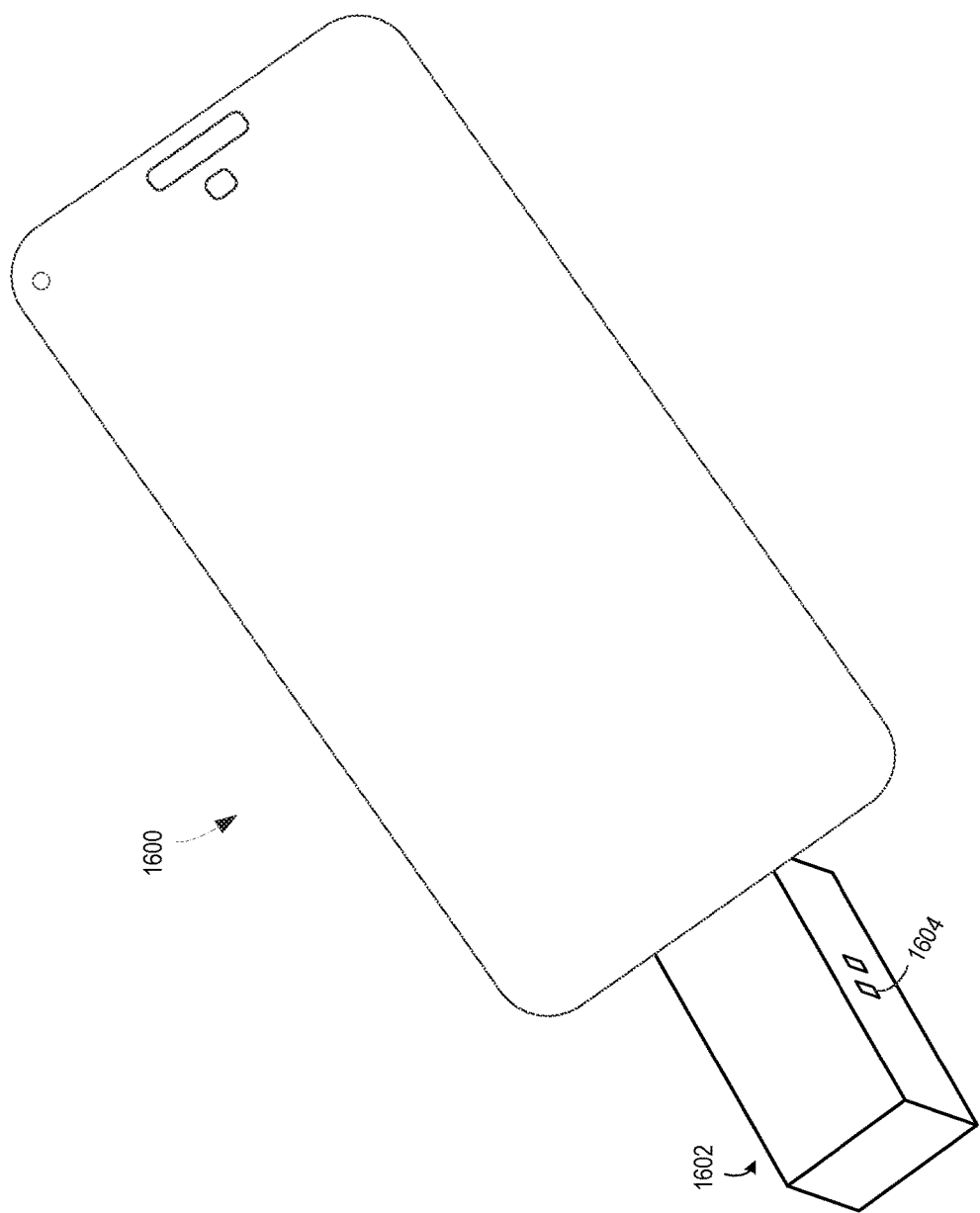
FIG. 16 illustrates a wireless adapter coupled to a portable electronic device, according to an example embodiment.

FIG. 16 illustrates a wireless power adapter 1602 that is coupled to a portable device 1600, according to an exemplary embodiment. The wireless power adapter 1602 may include an electrical coupling member that is compatible with a connector of the portable device 1600. For example, the electrical coupling member may be compatible with a USB-C port of the portable device 1600. The wireless adapter also includes an electrical coupling member 1604. In an embodiment, a power cord may couple the adapter 1602 and a power source in order to calibrate the adapter 1602 to provide power to the portable device 1600.

Figure 17:
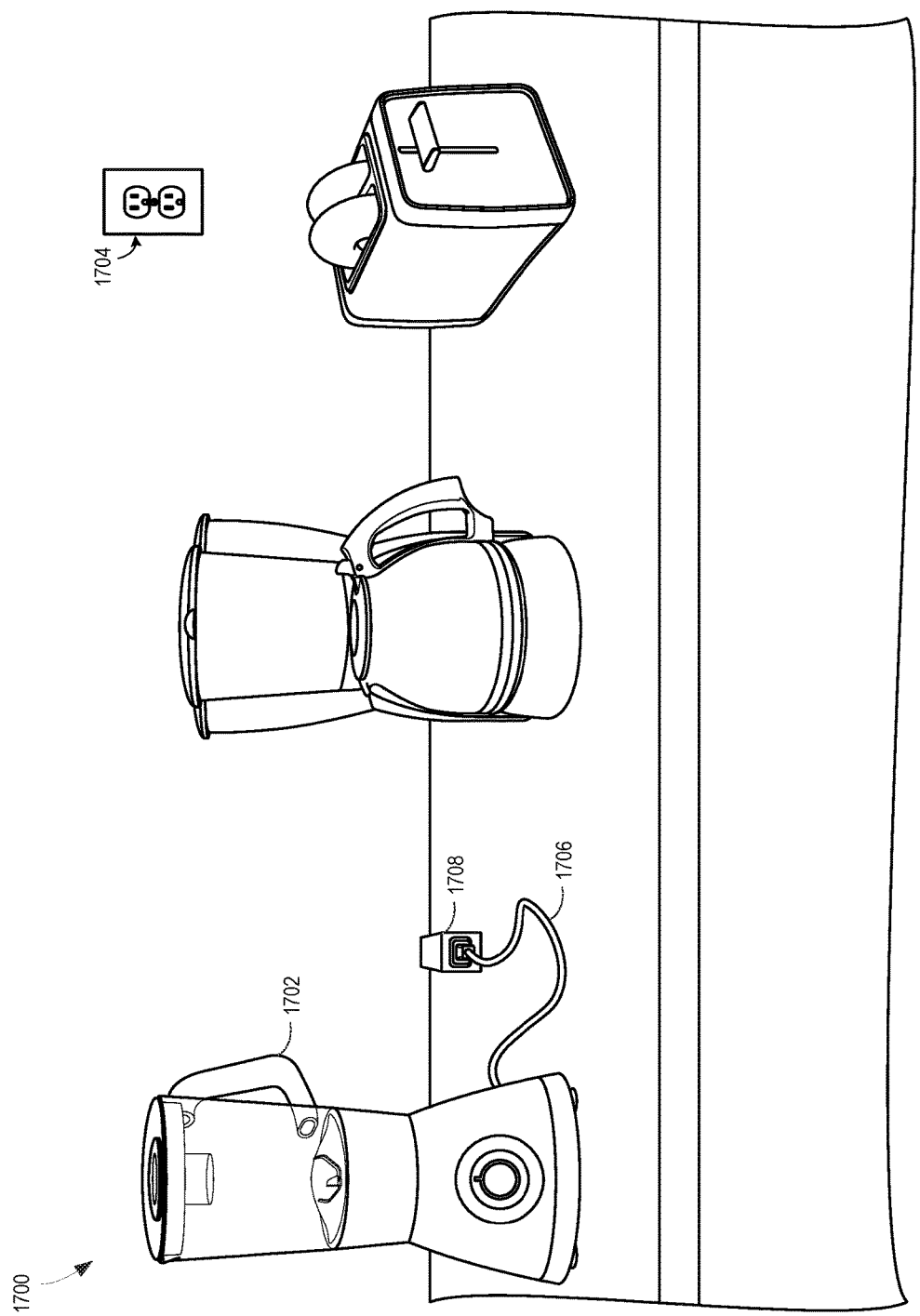
FIG. 17 illustrates a wireless adapter coupled to an appliance, according to an example embodiment.

FIG. 17 illustrates scenario 1700, which may include a wireless adapter 1704. As illustrated in FIG. 17, scenario 1700 may illustrate a kitchen that includes multiple appliances including a blender 1702. Further, due to spatial restrictions (e.g., outlet placement or other kitchen appliances), the blender 1702 is placed far away from the outlet 1704 such that a power cord 1706 of the blender 1702 does not reach the outlet 1704. Current solutions of using extension cords may be less aesthetically pleasing. Additional cords also add to the inconvenience of moving the blender 1702 (e.g., for cleaning) since the cords need to be unplugged and plugged again into the outlets to move the blender 1702. Other examples and advantages of the wireless power adapter 1708 are apparent to one of ordinary skill in the art. For example, the blender 1702 could be used in areas without any power outlets, but with a wireless power signal (e.g., outdoors, homes/buildings without hard-wired electrical outlets, etc.).

Furthermore, using a wireless power adapter 1708 to provide power to the blender 1702 may mitigate the inconveniences of plugging the power cord 1706 of the blender 1702 into the wall outlet 1704 or an extension cord. Using the wireless power adapter 1708 may also obviate safety concerns that may plague electronic devices. For example, the wireless power adapter may 1708 may monitor that power that is delivered to the one or more appliances that are coupled to the adapter 1708. By monitoring the power, the adapter 1708 may determine whether the power exceeds a threshold safety level. If the power that the one or more appliances are drawing from the adapter 1708 exceeds a certain level, the adapter 1708 may cease providing power to one or more of the appliances.

The example wireless adapters in FIGS. 12, 14, 15, 16, and 17 and the accompanying description herein is for illustrative purposes only and should not be considered limiting. In an implementation, the coupling mechanism between the adapter and the electrical cord of the legacy device may be a clamp with electrical leads. The leads of the clamp may be inserted into the legacy cord such that the adapter clamps onto the legacy cord and the leads of the clamp are touching the wires housed within the cord. Such a design may eliminate the need for electrical prongs, and therefore they may be removed from legacy devices. Removing the prongs may mitigate any dangers the electrical prongs pose, such as dangers to young children that may come in contact with the electrical prongs.

In another implementation, a wireless adapter may eliminate the need for an AC adapter (e.g., a wall wart or power brick) that is included in the power cable that couples between a legacy appliance and an outlet. Generally, the AC adapter receives AC power from AC mains via the outlet and converts the AC power to DC power or a lower AC voltage before routing the power to the legacy device. In this implementation, when a user couples a legacy device's power cable to the wireless adapter, the wireless adapter may query or probe the legacy device in order to determine whether the power cable of the legacy device includes an AC adapter. In an embodiment, the wireless adapter may query the legacy device by establishing a communications channel with the legacy device. Additionally and/or alternatively, the wireless adapter may request an input from a user that is indicative of the type of device and/or that is indicative of whether the legacy device's power cable includes an AC adapter.

If the wireless adapter determines that the legacy device includes an AC adapter, the wireless adapter may notify the user to connect the legacy device directly to the wireless adapter. As such, three sets of plugs are connected to the wireless adapter. The first plug is the plug of a power cable that couples the wireless adapter to an outlet (AC mains). The second plug is the plug of the power cable that couples the AC adapter to the wireless adapter. Note that the AC adapter power cable on the other end is coupled to the legacy device. And the third plug is the plug of the power cable that couples the legacy device directly to the wireless adapter.

By connecting the plugs to the wireless adapter, the wireless adapter may supply a test signal from the outlet to the legacy device via the AC adapter. The wireless adapter may then analyze the DC power that the legacy device receives. Thus, the wireless adapter may determine that the DC power that the legacy device requires to function properly. The wireless adapter may then be calibrated to provide the legacy device directly with the determined DC power. After this calibration step, the first and second power plugs may be removed, and the wireless adapter may receive power wirelessly from a wireless transmitter. The wireless adapter then supplies the legacy device with the determined DC power, thereby eliminating the need for the AC adapter.

In an example of this implementation, the wireless power adapter may determine (e.g., using the calibration method described above) that the operational configuration of the wireless adapter is an AC-DC configuration. Further, the wireless adapter may determine that the configuration may require a bridge rectifier to provide the legacy device with regulated DC voltage. In the embodiment where the wireless adapter is a modular adapter, the wireless adapter may provide a notification to a user to couple a bridge rectifier module to the adapter. The wireless adapter may then operate in the AC-DC configuration.

D. Example Wireless Power Adapter

Figure 18:
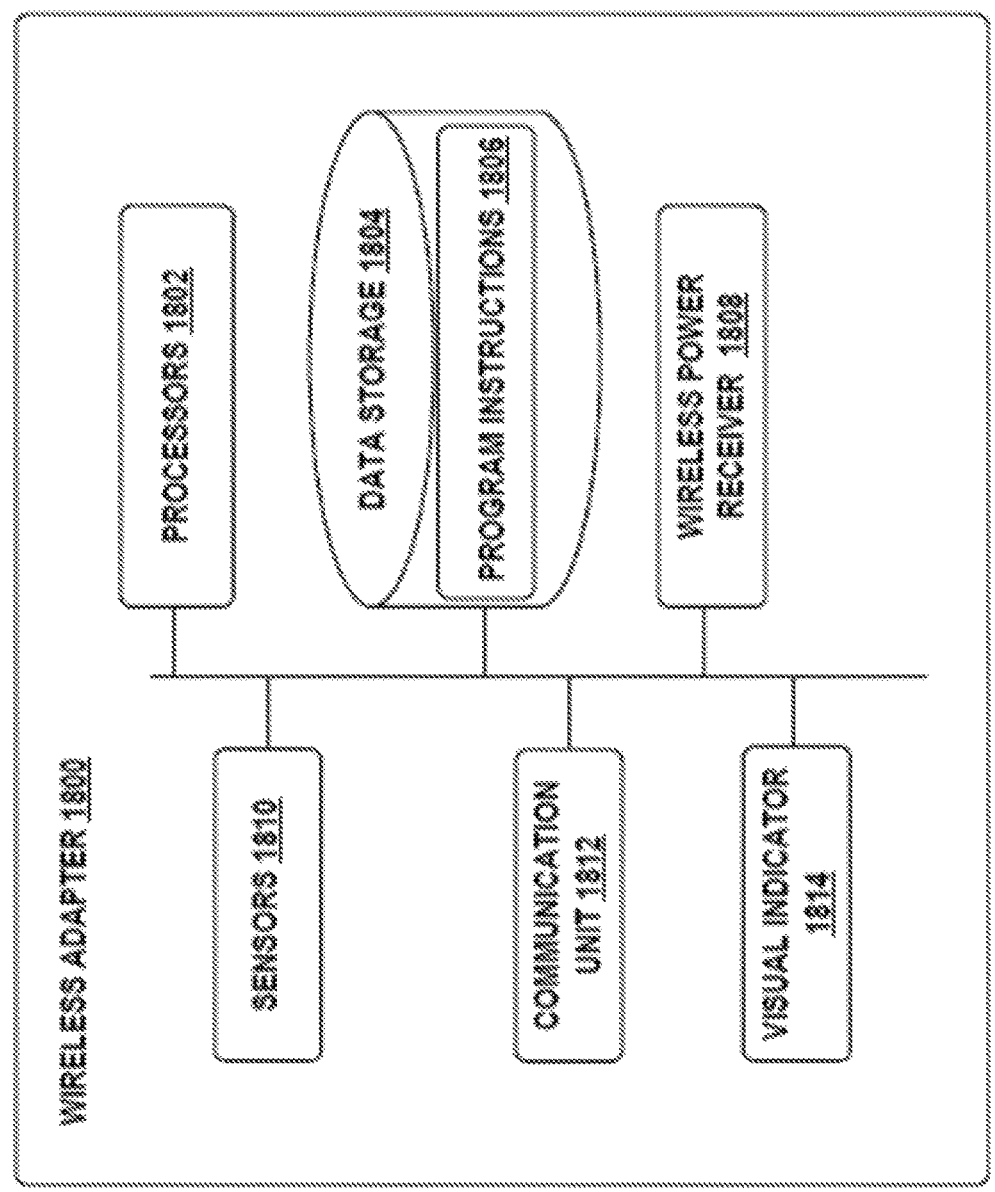
FIG. 18 is a block diagram illustrating a wireless adapter, according to an example embodiment.

FIG. 18 is a block diagram showing components of an example wireless power adapter 1800 that includes one or more processors 1802, data storage 1804, program instructions 1806, wireless power receiver 1808, sensors 1810, communication unit 1812, and a visual indicator 1814. Note that the adapter 1800 is shown for illustration purposes only and adapter 1800 may include additional components and/or have one or more components removed without departing from the scope of the disclosure. Further, note that the various components of adapter 1800 may be arranged and connected in any manner.

A processor, such as the processors 1802 or any other processor discussed in this description, can comprise one or more general purpose processors (e.g., INTEL single core microprocessors or INTEL multicore microprocessors) or one or more special purpose processors (e.g., digital signal processors). The processors 1802 can be configured to execute computer-readable program instructions, such as program instructions 1806. For purposes of this description, the processors 1802 executing the program instructions 1806 to perform some function described herein can comprise executing a portion of the program instructions 1806 or the entirety of the program instructions 1806. Executing a portion or the entirety of the program instructions 1806 can include executing some of the computer-readable program instructions multiple times.

The wireless power receiver 1808 may be may include a receive-resonator, such as the receive-resonator 112 of FIG.

1. The receive-resonator may have a high Q value and may also be configured to resonate at the system resonant frequency. The wireless power receiver 1808 may use the receive-resonator to couple with a wireless power transmitter to receive power from the transmitter. In some embodiment, the wireless adapter 1800 may include a receive-resonator and a transmit-resonator in order to operate as a transceiver.

The adapter 1800 may also include a communication unit 1816. The communication unit 1816 may include wired links and/or wireless links (e.g., using various wireless transmitters and receivers). A wired link may include, for example, a parallel bus or a serial bus such as a Universal Serial Bus (USB). A wireless link may include, for example, Bluetooth, IEEE 802.18(IEEE 802.18 may refer to IEEE 802.18-2007, IEEE 802.18n-2009, or any other IEEE 802.18 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.18).

The adapter 1800 may be coupled with one or more sensors such as optical flow sensors, force sensors, proximity sensors, motion sensors (e.g., gyroscopes, and/or accelerometers), load sensors, position sensors, thermal imaging sensors, depth sensors (e.g., RGB-D, laser, structured-light, and/or a time-of-flight camera), ultrasonic range sensors, infrared sensors, optical sensors, Radio Frequency identification (RFID) systems, Near Field Communication (NFC) chip, wireless sensors, light sensors, touch sensors (e.g., capacitive sensors), cameras (e.g., color cameras, grayscale cameras, and/or infrared cameras), and/or range sensors (e.g., ultrasonic and/or infrared), among others.

The wireless adapter may also include a visual indicator 1814. The visual indicator may be one or more LEDs. Additionally and/or alternatively, the visual indicator 1814 may be a display (e.g., LED, LCD, OLED, etc.). Further, the display may be a touchscreen display (e.g., a touchscreen display on a tablet). The display may show a graphical user interface (GUI) that may provide an application through which the user may interact with the systems disclosed herein.

III. Conclusion

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

The invention claimed is:
1. A wireless power adapter comprising:
a first electric coupling member operable to couple to a power source;
a second electric coupling member operable to couple to a legacy device;
a wireless power receiver operable to receive electrical energy from a wireless power transmitter via a wireless resonant coupling link; and
a controller configured to:
determine whether the wireless power adapter has access to preexisting calibration data for supplying the legacy device with electrical energy;
in response to the determination that the wireless power adapter does not have access to preexisting calibration data for supplying the legacy device with electrical energy, deliver a first power signal to the legacy device via the second electric coupling member, wherein the first power signal is received from the power source via the first electric coupling member;
receive information indicative of a response of the legacy device to receiving the first power signal, wherein the detected response is indicative of at least one of: a voltage response, a current response, and a load impedance;
based on the received information, identify a type of the legacy device;
based on a power characteristic associated with the identified type of the legacy device, determine an operational configuration of the wireless power adapter; and
configure the wireless power adapter to provide power to the legacy device according to the determined operational configuration.

2. The wireless power adapter of claim 1, wherein the controller is further configured to:
cause the wireless power receiver to couple to the wireless power transmitter via the wireless resonant coupling link to receive a second power signal;
modify the second power signal to generate a third power signal, wherein the modification of the second power signal depends on the determined operational configuration of the wireless power adapter; and
deliver the third power signal to the legacy device via the second electrical coupling member.

3. The wireless power adapter of claim 2, wherein the second power signal is a carrier signal modulated with an AC power signal, and wherein the controller configured to modify the second power signal comprises the controller configured to:
determine that the operational configuration is a direct current (DC) power configuration; causing a demodulator to demodulate the the carrier signal to extract the AC power signal; rectify the AC power signal to generate a DC power signal, wherein the DC power signal is the third power signal.

4. The wireless power adapter of claim 2, wherein the wireless power adapter is operable to interchangeably couple with different types of power electronic devices, and wherein the controller configured to determine an operational configuration of the wireless power adapter further comprises the controller configured to:
output a notification indicative of the identified type of legacy device.

5. The wireless power adapter of claim 4, wherein the second power signal comprises an AC power signal, wherein the operational configuration is a direct current (DC) power configuration, and wherein the controller configured to modify the second power signal comprises the controller configured to cause a rectifier to rectify the AC power signal to generate a DC power signal, wherein the DC power signal is the third power signal.

6. The wireless power adapter of claim 1, wherein the controller is further configured to:
in response to the determination that the wireless power adapter does have access to preexisting calibration data for supplying the legacy device with electrical energy, cause the wireless power receiver to couple to the wireless power transmitter via the wireless resonant coupling link to receive a second power signal.

7. The wireless power adapter of claim 1, wherein the detected response of the legacy device is a transient response of the legacy device to receiving the first power signal.

8. The wireless power adapter of claim 1, wherein the first power signal is a pulsed power signal.

9. The wireless power adapter of claim 1, wherein the detected response is further indicative of at least one of: a functional form of the detected response and harmonic characteristics of the detected response.

10. The wireless power adapter of claim 1, wherein the first electrical coupling member is an electrical outlet operable to receive an electrical terminal of an electric wire that is coupled to the power source.

11. The wireless power adapter of claim 1, wherein the second electric coupling member is an electrical outlet operable to receive an electrical terminal of an electric wire that is coupled to the legacy device.

12. The wireless power adapter of claim 1, wherein the second electric coupling member is an electrical clamp operable to couple to an electrical wire by clamping onto the electrical wire such that leads of the electrical clamp contact the electrical wire, and wherein the electrical wire is coupled to the legacy device.

13. The wireless power adapter of claim 1, further comprising a visual indicator of at least one of: a coupling factor of the wireless coupling link and the operational configuration, and wherein the controller is further configured to:
   determine that the operational configuration is a direct current (DC) power configuration; causing a demodulator to demodulate a carrier signal to extract an AC power signal;
   causing a rectifier to rectify the AC power signal to generate a DC power signal, wherein the DC power signal is a third power signal.

14. The wireless power adapter of claim 13, wherein the visual indicator is a light-emitting diode (LED).

15. A method of determining an operational configuration of a wireless power adapter, the method comprising:
   determining whether the wireless power adapter has access to preexisting calibration data for supplying a legacy device with electrical energy received via a wireless power receiver, wherein the wireless power receiver is operable to receive electrical energy from a wireless power transmitter via a wireless resonant coupling link;
   in response to determining that the wireless power adapter does not have access to preexisting calibration data for supplying the legacy device with electrical energy,
   delivering a first power signal to the legacy device via a first electrical coupling member, wherein the first power signal is received from a power source via a second electric coupling member;
   detecting a response of the legacy device to receiving the first power signal, wherein the detected response is indicative of at least one of: a voltage response, a current response, and a load impedance;
   based on the response of the legacy device, identifying a type of the legacy device;
   based on a power characteristic associated with the identified type of the legacy device, determining an operational configuration of the wireless power adapter; and
   configuring the wireless power adapter to provide power to the legacy device according to the determined operational configuration.

16. The method of claim 15, further comprising:
   causing the wireless power receiver to couple to the wireless power transmitter via the wireless resonant coupling link to receive a second power signal;
   modifying the second power signal to generate a third power signal, wherein the modification of the second power signal depends on the determined operational configuration of the wireless power adapter; and
   delivering the third power signal to the legacy device via the first electrical coupling member.

17. The method of claim 16, wherein modifying the second power comprises:
   determining that the operational configuration is a direct current (DC) power configuration;
   demodulating a carrier signal to extract an AC power signal;
   rectifying the AC power signal to generate a DC power signal, wherein the DC power signal is the third power signal.

18. The method of claim 16, wherein the wireless power adapter is operable to interchangeably couple with different types of power electronic devices, and wherein determining an operational configuration of the wireless power adapter further comprises:
   outputting a notification indicative of the identified type of legacy device.

19. The method of claim 18, wherein the second power signal comprises an AC power signal, wherein the operational configuration is a direct current (DC) power configuration, and wherein modifying the second power comprises causing a rectifier to rectify the AC power signal to generate a DC power signal, wherein the DC power signal is the third power signal.

* * * * *